US010830358B2

(12) United States Patent
Hostetter et al.

(10) Patent No.: US 10,830,358 B2
(45) Date of Patent: Nov. 10, 2020

(54) VALVE TRIM HAVING ADJUSTABLE FLUID FLOW CHARACTERISTICS AND RELATED METHODS

(71) Applicant: FISHER CONTROLS INTERNATIONAL LLC, Marshalltown, IA (US)

(72) Inventors: Steven Hostetter, Colfax, IA (US); Wesley Ohrt, Kellogg, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/384,402

(22) Filed: Apr. 15, 2019

(65) Prior Publication Data
US 2020/0325996 A1 Oct. 15, 2020

(51) Int. Cl.
*F16K 1/52* (2006.01)
*F16K 1/42* (2006.01)
*F16K 3/24* (2006.01)

(52) U.S. Cl.
CPC .................. *F16K 1/52* (2013.01); *F16K 1/42* (2013.01); *F16K 1/427* (2013.01); *F16K 3/246* (2013.01)

(58) Field of Classification Search
CPC . F16K 3/246; F16K 3/267; F16K 3/32; F16K 3/34; F16K 1/42; F16K 1/427; F16K 1/52
See application file for complete search history.

(56) References Cited

U.S. PATENT DOCUMENTS

2017/0184219 A1 6/2017 Braeuer
2019/0120388 A1* 4/2019 Kloss ........................ F16K 1/50

FOREIGN PATENT DOCUMENTS

WO 2018217449 11/2018

OTHER PUBLICATIONS

Intellectual Property Office of the United Kingdom, "Search and Examination Report," issued in connection with British Patent Application No. GB2005101.7, dated Aug. 14, 2020, 6 pages.

* cited by examiner

*Primary Examiner* — Hailey K. Do
(74) *Attorney, Agent, or Firm* — Hanley, Flight & Zimmerman, LLC

(57) ABSTRACT

Valve trim and related methods are described. An example valve trim includes a cage defining a body having a bore to receive a valve plug. The cage includes a plurality of passageways through a side surface of the body that are radially spaced relative to a longitudinal axis of the bore. A valve seat to receive the cage. The valve seat has a plurality of projections defining a plurality of first openings and a plurality of second openings. Ones of the first openings to align with respective ones of the passageways to provide a first flow characteristic when the cage is positioned in a first orientation relative to the valve seat. Ones of the second openings to align with respective ones of the passageways of the cage to provide a second flow characteristic different than the first flow characteristic when the cage is positioned in a second orientation relative to the valve seat different from the first orientation.

20 Claims, 19 Drawing Sheets

US 10,830,358 B2

VALVE TRIM HAVING ADJUSTABLE FLUID FLOW CHARACTERISTICS AND RELATED METHODS

FIELD OF THE DISCLOSURE

This disclosure relates generally to fluid valves and, more particularly, to valve trim having adjustable fluid flow characteristics and related methods

BACKGROUND

Control valves are often used in industrial processes such as, for example, oil and gas pipeline distribution systems and chemical processing plants to control flow of process fluids. Control valves often employ a valve trim including a cage having one or more openings to alter a fluid flow pattern to provide a desired fluid flow characteristic through the valve.

SUMMARY

An example valve trim includes a cage defining a body having a bore to receive a valve plug. The cage includes a plurality of passageways through a side surface of the body that are radially spaced relative to a longitudinal axis of the bore. A valve seat to receive the cage. The valve seat has a plurality of projections defining a plurality of first openings and a plurality of second openings. Ones of the first openings to align with respective ones of the passageways to provide a first flow characteristic when the cage is positioned in a first orientation relative to the valve seat. Ones of the second openings to align with respective ones of the passageways of the cage to provide a second flow characteristic different than the first flow characteristic when the cage is positioned in a second orientation relative to the valve seat different from the first orientation.

In another example, valve includes a valve body defining a fluid flow passageway between an inlet and an outlet. A valve seat is positioned in the valve body to define an orifice of the fluid flow passageway, the valve seat defining a plurality of projections. A cage is positioned in the fluid flow passageway, the cage defining a bore and a plurality of passageways formed through a side surface of the cage. The cage slidably receives a valve plug at a first end of the bore and at least partially receives a portion of the projections of the valve seat at a second end of the bore opposite the first end.

In yet another example, a valve trim includes means for sealing including means for obstructing fluid flow and means for guiding a valve plug. The means for guiding includes means for characterizing fluid flow. The means for guiding is positionable relative to the means for sealing between at least one of a first orientation or a second orientation different from the first orientation. The means for obstructing fluid flow is positioned adjacent the means for characterizing fluid flow when the means for guiding is in the first orientation, and the means for obstructing fluid flow is to align with the means for characterizing fluid flow when the means for guiding is in the second orientation.

BRIEF DESCRIPTION OF THE DRAWINGS

FIG. 12A is a perspective view of the example cage. FIG. 12B is a front view of FIG. 12A. FIG. 12C is a left side view of FIG. 12A. FIG. 12D is a right side view of FIG. 12A. FIG. 12E is a rear view of FIG. 12A. FIG. 12F is a top view of FIG. 12A. FIG. 12G is a bottom view of FIG. 12A.

FIG. 13A is a perspective view of the example cage. FIG. 13B is a front view of FIG. 13A. FIG. 13C is a left side view of FIG. 13A. FIG. 13D is a right side view of FIG. 13A. FIG. 13E is a rear view of FIG. 13A FIG. 13F is a top view of FIG. 13A. FIG. 13G is a bottom view of FIG. 13A.

DETAILED DESCRIPTION

Figure 1:
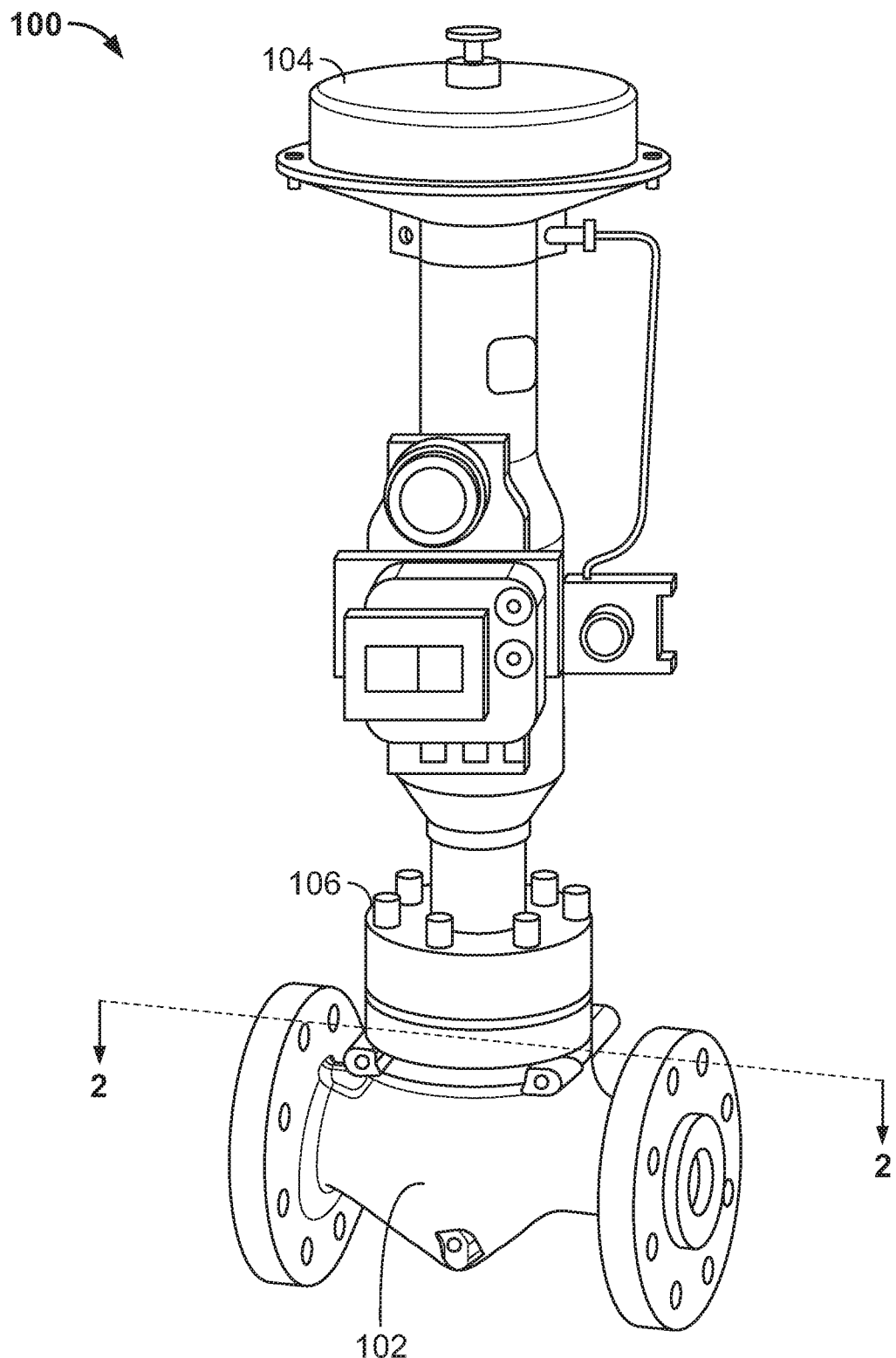
FIG. 1 illustrates an example control valve constructed in accordance with the teachings of this disclosure.

To accommodate different process flow demands, control valves can be configured to provide various fluid flow characteristics. In some examples, a flow characteristic is based on a relationship between control valve fluid flow capacity and valve plug (e.g., stem) travel, which is commonly referred to as an inherent flow characteristic of a control valve. To provide a desired flow capacity and valve plug travel ratio, control valves employ a valve trim apparatus. The different valve trim apparatus can be selected to affect how a capacity of a control valve changes as a flow control member of the valve moves through a complete stroke or travel. Thus, different valve trim apparatus can be employed to meet a variety of control application needs and/or flow characteristics. However, employing different valve trim apparatus to achieve different fluid flow characteristics increases manufacturing costs.

Example valve trim and related methods disclosed herein provide adjustable fluid flow characteristics (e.g., inherent fluid flow characteristics). For example, a single valve trim apparatus disclosed herein can be configured to provide multiple different fluid flow characteristics. In this manner, a single valve trim apparatus (e.g., a cage and a valve seat) can be used to provide a first fluid flow characteristic (e.g., a linear fluid characteristic) or a second fluid flow characteristic (e.g., an equal percentage fluid flow characteristic) different than the first fluid flow characteristic. As a result, example valve trim disclosed herein significantly reduce manufacturing costs.

Example valve trim disclosed herein employ a cage and a valve seat (e.g. a seat ring). Specifically, an orientation of the cage relative to the seat ring defines a fluid flow characteristic of the example valve trim apparatus. For example, a fluid flow characteristic provided by an example cage and the valve seat disclosed herein is based on an example window geometry (e.g., a passageway) of the cage. To vary or change a fluid flow characteristic of the example valve, an orientation of the cage relative to the valve seat is changed to vary or change a fluid flow path or window geometry of the valve trim. To vary the fluid flow path or window geometry of the valve trim, a passageway or opening of the cage aligns with an overlapping obstruction or projection provided by or formed on the valve seat. In a first instance, to provide a first flow characteristic, the cage is coupled to the valve seat in a first orientation such that a passageway of the cage is at least partially obstructed or blocked by a projection (e.g., a prong, a wall, a finger, etc.) supported by the valve seat. In second instance, to provide a second flow characteristic different than the first flow characteristic, the cage is coupled to the valve seat in a second orientation such that a passageway of the cage is clear of or unobstructed by (e.g., the projection supported by) the valve seat. Different fluid flow characteristics can be provided based on a variation in a window geometry of the valve trim effected by an orientation of the cage relative to the valve seat (e.g., a variation in a flow path defined by a positional relationship between the passageway of the cage and the obstruction of the valve seat). In some examples, the varying window geometry enables the valve trim apparatus disclosed herein to create different flow characteristic options (e.g., linear and equal-percentage) using a single set of parts (e.g., a cage and a valve seat). For example, to modify the fluid flow characteristic of a control valve, a user of the control valve can simply change an orientation of the cage relative to the valve seat without having to purchase additional trim parts (e.g., a cage) and switching out one trim part for another. Thus, example valve trim apparatus disclosed herein reduce the quantity of parts that would otherwise be manufactured to provide multiple different flow characteristics.

Example valve trim apparatus disclosed here can be configured to provide a first flow characteristic, a second fluid flow characteristic different than then the first flow characteristic, a third flow characteristic different than the first and second flow characteristics, etc. Example fluid flow characteristics can include, but are not limited to, a linear flow characteristic (e.g., a flow capacity that increases linearly with valve stem travel), an equal percentage flow characteristic (e.g., flow capacity that increases exponentially with valve trim travel), a modified parabolic characteristic (e.g., a flow capacity that is approximately midway between linear and equal-percentage characteristics to provide fine throttling at low flow capacity and approximately linear characteristics at higher flow capacity), a quick opening flow characteristic (e.g., provides large changes in flow for very small changes in valve stem travel), a hyperbolic flow characteristic, a square root flow characteristic, and/or any other flow characteristic(s).

FIG. 1 illustrates a control valve 100 constructed in accordance with the teachings of this disclosure. The control valve 100 includes a fluid valve 102 coupled to an actuator 104 via a bonnet 106. The actuator 104 moves the fluid valve 102 between a closed position to prevent fluid flow through the fluid valve 102 and an open position to allow fluid flow through the fluid valve 102. The actuator 104 of the illustrated example is a pneumatic diaphragm actuator. However, in other examples, the actuator 104 can be a piston actuator, a bellows actuator, an electric actuator, and/or any other actuator. The control valve 100 of the illustrated example can be employed with various industrial processes (e.g., petrochemical applications, subsea applications, paper and pulp applications, etc.), high pressure differential applications, and/or any other application(s).

Figure 2:
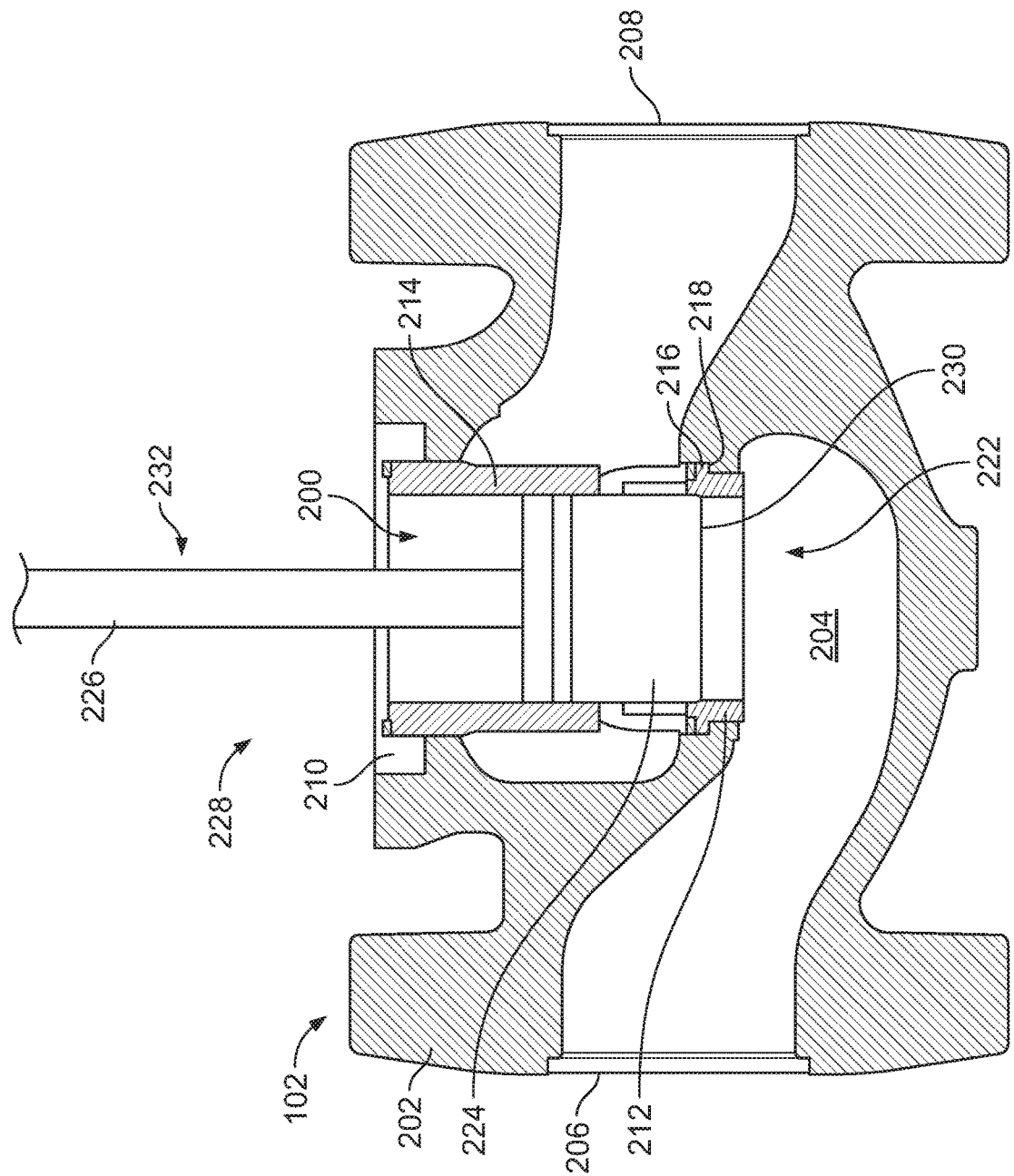
FIG. 2 is a cross-sectional view of an example fluid valve taken along line 2-2 of FIG. 1 shown in an example closed position.

FIG. 2 is a cross-sectional view of the fluid valve 102 taken along line 2-2 of FIG. 1. The fluid valve 102 includes a valve trim 200 in accordance with teachings of this disclosure. The fluid valve 102 includes a valve body 202 defining a fluid flow passageway 204 between an inlet 206 and an outlet 208. The valve body 202 includes a bore 210 to receive the valve trim 200 and position the valve trim 200 in the fluid flow passageway 204. The valve trim 200 of the illustrated example is clamped in the valve body 202 via the bonnet 106 (FIG. 1). For example, the valve trim 200 of the illustrated example includes a valve seat 212 and a cage 214. For example, the valve seat 212 of the illustrated example includes an annular wall 216 (e.g., a shoulder) that engages a wall or shoulder 218 of the valve body 202. A first end of the cage 214 engages (e.g., rests) on a shoulder defined by the annular wall 216 of the valve seat 212. To retain the valve trim 200 in the valve body 202, the bonnet 106 engages or clamps the cage 214 against the valve seat 212. In other words, the valve seat 212 and the cage 214 are clamped between the bonnet 106 and the shoulder 218 of the valve body 202. In some examples, the cage 214 can be integrally formed with, or attached to, the bonnet 106 and the valve seat 212 can be coupled (e.g., fastened) to the cage 214 via fasteners (e.g., screws, etc.). In some such examples, the cage 214 and the valve seat 212 provide a hung-trim configuration. In some examples, the valve seat 212 can be fastened to the valve body 202 via fasteners, threads and/or any other fastener(s). In some examples, the valve seat 212 may be integrally formed with the valve body 202.

When positioned in the fluid flow passageway 204, the valve seat 212 defines an orifice 222 of the fluid flow passageway 204 and the cage 214 guides a flow control member 224 (e.g., a valve plug). The actuator 104 (FIG. 1) operatively couples to the flow control member 224 via a valve stem 226. To control fluid flow through the orifice 222, the actuator 104 (FIG. 1) moves the flow control member 224 between a first position or a closed position 228 (e.g., as shown in FIG. 2) at which the flow control member 224 sealingly engages a sealing surface 230 (e.g., a lip) of the valve seat 212 to prevent fluid flow through the fluid flow passageway 204 and a second position or an open position (e.g., an open position 300 of FIG. 3) at which the flow control member 224 disengages from the sealing surface 230 of the valve seat 212 to allow fluid flow through the fluid flow passageway 204. In the closed position 228 of FIG. 2, the valve stem 226 (e.g., via the actuator 104) is positioned at a first stroke position 232.

Figure 3:
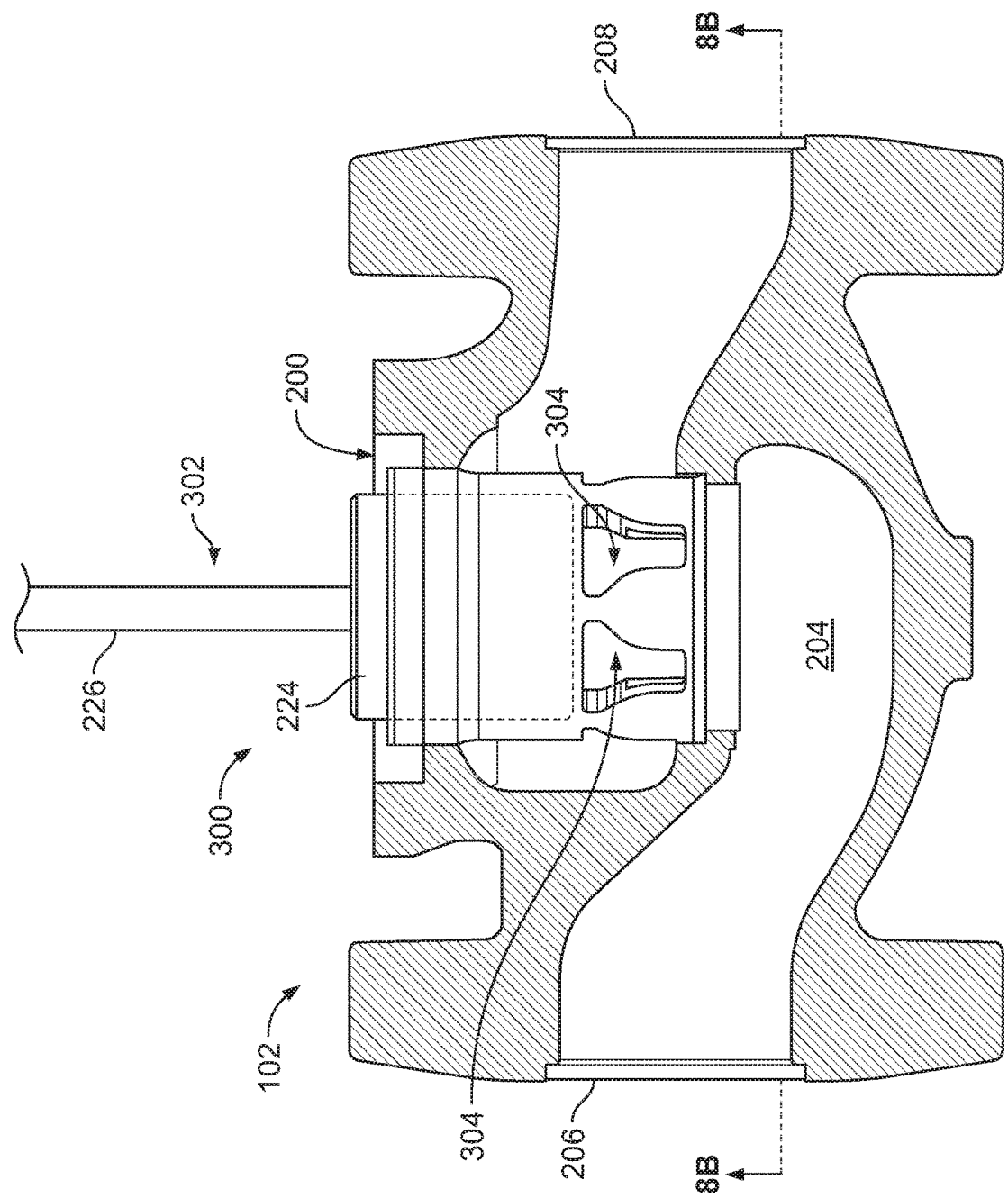
FIG. 3 is a cross-sectional view of the example fluid valve of FIGS. 1-2 shown in an example open position.

FIG. 3 is a cross-sectional view of the fluid valve 102 of FIGS. 1-2 shown in an open position 300. In the open position 300, the valve stem 226 (e.g., via the actuator 104 of FIG. 1) is at a second stroke position 302. In the open position 300, the valve trim 200 of the illustrated example enables fluid to flow through fluid flow passageway 204 between the inlet 206 and the outlet 208. Specifically, in the open position 300, fluid flows through one or more windows or openings 304 provided by the valve seat 212 and the cage 214 that fluidly couple the inlet 206 and the outlet 208. The openings 304 of the valve trim 200 affect fluid flow to provide a fluid flow characteristic to fluid flowing through the fluid flow passageway 204. For example, the valve trim 200 of the illustrated example defines a flow characteristic of the control valve 100 based on a relationship between fluid flow capacity and valve stem travel (e.g. valve stem travel between the first stroke position 232 of FIG. 2 and the second stroke position 302 of FIG. 3). The valve trim 200 affects how a flow capacity of the control valve 100 changes as the flow control member 224 moves through a complete stroke or travel for a constant pressure drop across the fluid valve 102 (e.g., inherent flow characteristics). In some examples, the openings 304 provide means for characterizing or affecting fluid flow through the fluid flow passageway 204. The flow characteristic provided by the valve trim 200 of the illustrated is based on a dimensional size and/or geometric shape of (e.g., a flow path through) of the openings 304. As described in greater detail below, to vary or adjust the flow characteristics, the sizes of the openings 304 are varied by changing (e.g., clocking) an orientation of the cage 214 relative to the valve seat 212.

Figure 4:
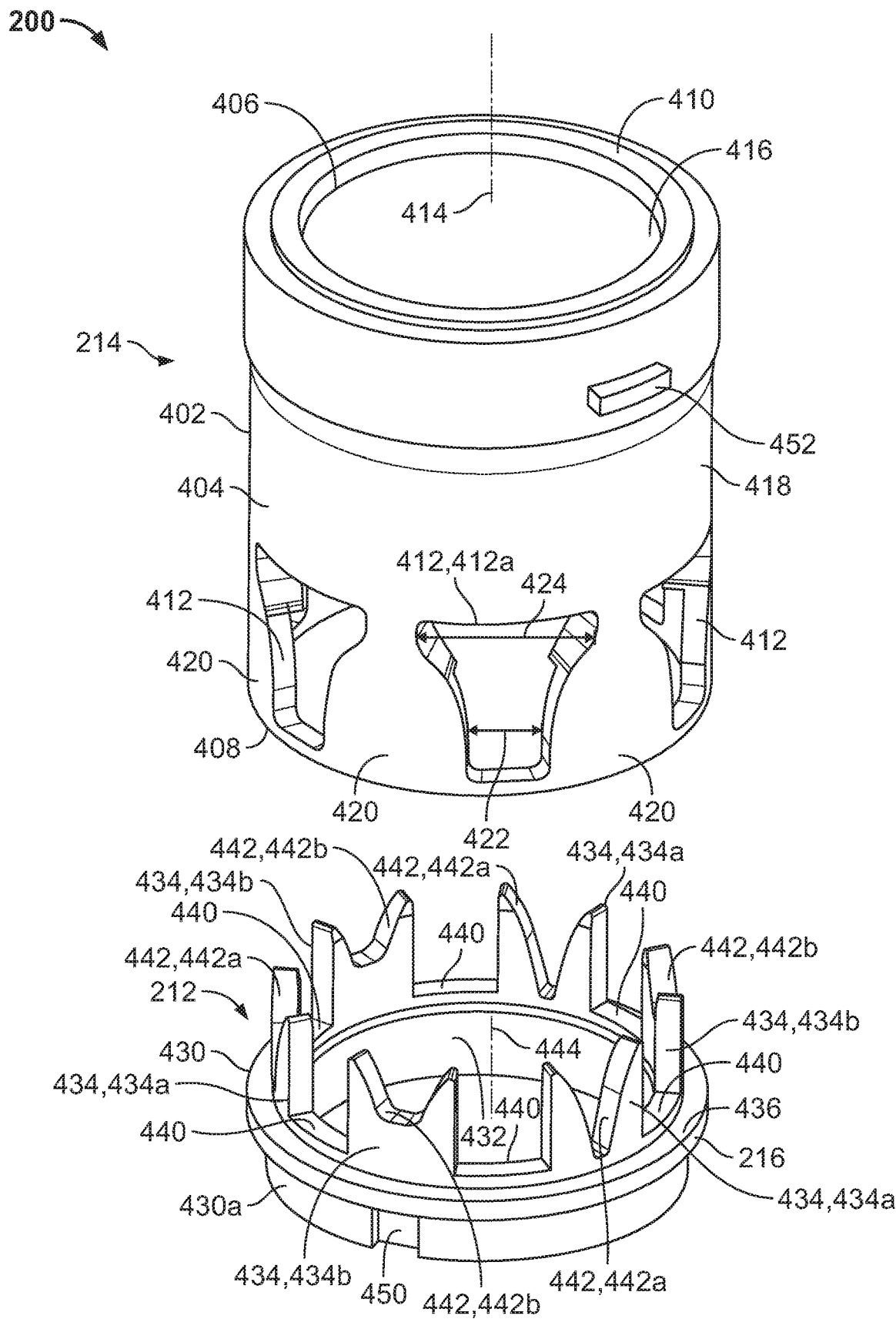
FIG. 4 is an exploded, perspective view of an example valve trim of FIGS. 1-3.

FIG. 4 is an exploded, perspective view of the valve trim 200 of FIGS. 1-3. The cage 214 defines a body 402 having a side surface 404 and a central bore 406 to slidably receive the flow control member 224. The central bore 406 extends between a first end 408 of the body 402 and a second end 410 of the body 402 opposite the first end 408. The body 402 of the illustrated example is a cylinder. The cage 214 includes a plurality of passageways 412 (e.g., windows) through the side surface 404 of the body 402. The passageways 412 are radially spaced relative to a longitudinal axis 414 of the central bore 406 of the cage 214. Specifically, the passageways 412 extend through the body 402 between an inner surface 416 of the cage 214 defined by the central bore 406 and an outer surface 418 defined by the side surface 404. Walls 420 separate (e.g., are positioned between) the plurality of passageways 412. Each of the passageways 412 extends along a portion of a longitudinal length of the body 402 of the cage 214 adjacent the first end 408. Each of the passageways 412 has a varying geometry. For example, a first portion of a passageway 412a has a first dimensional width 422 and a second portion of the passageway 412a has a second dimensional width 424 that is different (e.g., greater) than the first dimensional width 422. In some examples, the passageways 412 have a T-shaped cross-sectional shape. In some examples, the passageways 412 can have any other shape such as, for example, a square shape, a circular shape, an oblong or elliptical shape, etc.

The valve seat 212 of the illustrated example is a seat ring. The valve seat 212 defines a valve seat body 430 having a central bore 432 defining the orifice 222 (FIG. 2) of the fluid flow passageway 204 (FIG. 2). The valve seat 212 includes a plurality of prongs or projections 434. Specifically, the projections 434 project toward the cage 214 from an upper surface 436 of the valve seat 212. The projections 434 having a longitudinal length configured to at least partially extend within the central bore 406 of the cage 214. In other words, the cage 214 slidably receives the flow control member 224 at the second end 410 of the central bore 406 of the cage 214 and at least partially receives portions of the projections 434 of the valve seat 212 at the first end 408 of the central bore 406.

The projections 434 define a plurality of first openings 440 and a plurality of second openings 442. The projections 434 of the illustrated example are radially spaced relative to a longitudinal axis 444 of the valve seat 212. For example, the projections 434 of the illustrated example are radially spaced symmetrically at equal-distance intervals (e.g., 60 degrees apart). Respective ones of the first openings 440 are positioned between the projections 434. Thus, the first openings 440 and the second openings 442 are arranged in an alternating pattern. However, in some examples, the projections 434 can be spaced asymmetrically. In some examples, the first openings 440 and the second openings 442 can be provided in a non-alternating pattern (e.g., a random pattern).

Each of the first openings 440 of the illustrated example has a first dimensional area and each of the second openings 442 has a second dimensional area that is different (e.g., smaller than) the first dimensional area of the first openings 440. In other words, a greater volume of fluid can pass through the first openings 440 compared to the second openings 442. The first openings of the illustrated example have a U-shaped profile.

The projections 434 include a first set 434a of projections 434 defining a first set 442a of the second openings 442 and a second set 434b of the projections 434 defining a second set 442b of the second openings 442 different than the first set 442a of the second openings 442. A respective one of the first openings 440 is positioned between a respective one of the first set 434a of the projections 434 and a respective one of the second set 434b of the projections 434. The first set 442a of the second openings 442 of the illustrated example include V-shaped openings and the second set 442b of the second openings 442 of the illustrated example include Y-shaped openings. The first set 434a of the projections 434 of the illustrated example includes three projections and the second set 434b of the projections 434 of the illustrated example includes three projections. In some examples, the valve seat 212 can be configured with the first set 434a of projections 434 (e.g., six projections 434 having the first set 442a of the second openings 442) or the second set 434b of the projections 434 (e.g., six projections 434 having the second set 442b of the second openings 442). In some examples, the valve seat 212 can include projections and/or openings having different shapes and/or profiles (e.g., rectangular openings, circular openings, oblong openings, etc.). In some examples, the valve seat 212 includes one projection or obstruction structure and the cage 214 includes one passageway 412.

As noted above, the flow characteristic of the fluid valve 102 is provided by an orientation of the cage 214 relative to the valve seat 212. To facilitate such orientation, the valve seat 212 of the illustrated example includes a locating slot 450 (e.g., a recess) to locate or position the valve seat 212 relative to the valve body 202 in a predetermined position. The locating slot 450 is formed on an outer surface 430a of the valve seat body 430 adjacent the annular wall 216. To orient or a position of the cage 214 in a predetermined position or orientation relative to the valve body 202 and/or the valve seat 212, the cage 214 of the illustrated example includes an orientation tab 452. The orientation tab 452 of the illustrated example projects from the outer surface 418 of the cage 214. In some examples, the valve trim 200 does not include the locating slot 450 and/or the orientation tab 452.

Figure 5:
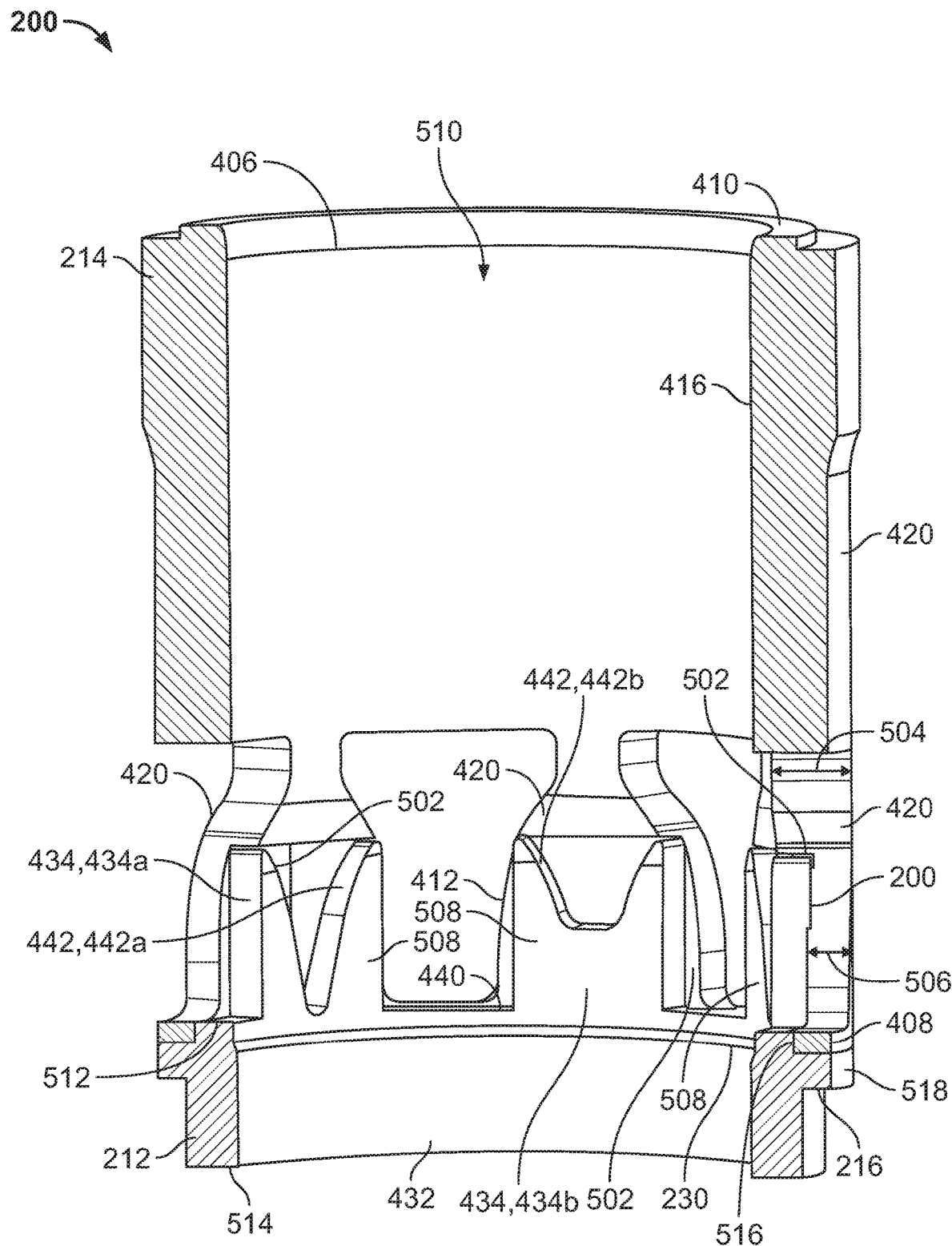
FIG. 5 is a cross-sectional view of the example valve trim of FIGS. 1-4.

FIG. 5 is a cross-sectional view of the valve trim 200 of FIG. 4. As shown in FIG. 5, at least a portion of each of the projections 434 (e.g., the prongs or fingers) extends into the central bore 406 of the cage 214. For example, the projections 434 have longitudinal lengths capable of extending across at least portions of the passageways 412. In the illustrated example, each of the projections 434 has a longitudinal length configured to extend across at least portions of the passageways 412 of the cage 214 when the valve seat 212 is coupled to the cage 214. In some examples, at least one of the projections 434 has a longitudinal length capable of extending across at least a portion of at least one of the passageways 412.

The walls 420 of the cage 214 adjacent the passageways 412 include an offset profile 502 to receive the projections 434 when the cage 214 couples to the valve seat 212. In other words, the walls 420 have a first dimension 504 (e.g. a first thickness) and a second dimension 506 (e.g., a second thickness) different (e.g., less) than the first dimension 504. In this manner, respective ones of the projections 434 nest within respective ones of the offset profiles 502 of the walls 420. As a result, an inner surface 508 of each of the projections 434 defining the central bore 432 of the valve seat 212 is substantially flush relative to the inner surface 416 defining the central bore 406 of the cage 214. In other words, the central bore 406 of the cage 214 and the central bore 432 of the valve seat 212 defined by the projections 434 form a substantially unitary central opening 510 to slidably receive the flow control member 224 between the second end 410 of the cage 214 and the sealing surface 230 of the valve seat 212. As a result, the projections 434 do not interfere with the flow control member 224 as the flow control member 224 moves between the open position 300 and the closed position 228. The sealing surface 230 of the valve seat 212 is positioned between a first end 512 of the valve seat 212 from which the projections 434 extend and a second end 514 of the valve seat 212 opposite the first end 512. Thus, the flow control member 224 of the illustrated example travels along the inner surfaces 416 and 504 of the cage 214 and the valve seat 212, respectively, to engage the sealing surface 230 of the valve seat 212. The annular wall 216 of the valve seat 212 of the illustrated example defines a wall or shoulder 516 to engage (e.g., receive) the first end 408 of the cage 214 when the cage 214 is coupled to the valve seat 212. Further, an outer surface 518 of the annular wall 216 of the valve seat 212 is substantially flush mounted relative to the outer surface 418 adjacent the first end 408 of the cage 214.

Figure 6:
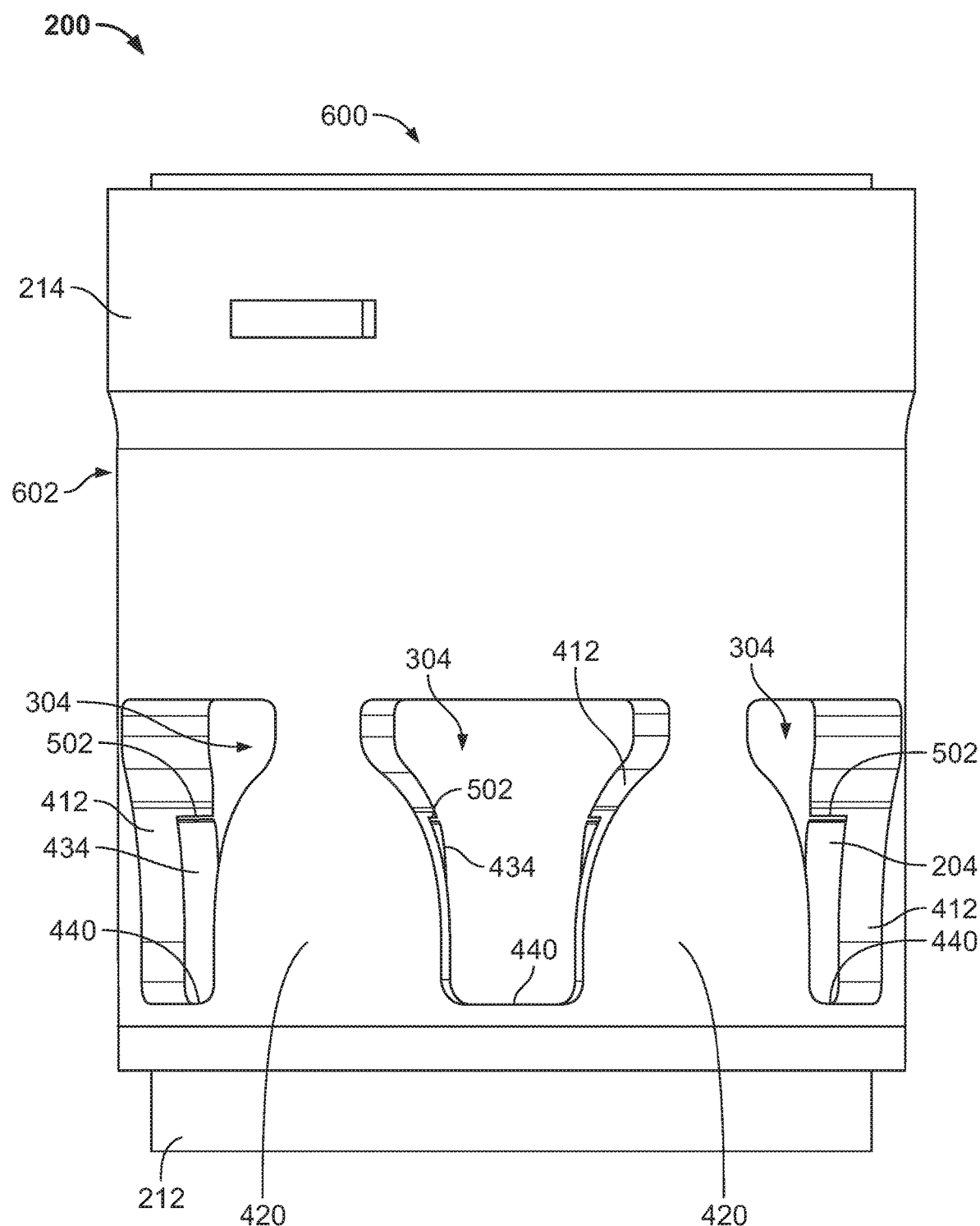
FIG. 6 is a front view of the example valve trim of FIGS. 1-5 configured to provide a first flow characteristic.

FIG. 6 is a front view of the valve trim of FIGS. 1-5 configured to provide a first flow characteristic 600. The first flow characteristic 600 of the illustrated example provides a linear flow characteristic for a given change in position of the flow control member 224 as the flow control member 224 moves from the closed position 228 (FIG. 2) toward the open position 300 (FIG. 3). The valve trim 200 provides the first flow characteristic 600 when the cage 214 is positioned in a first orientation 602 relative to the valve seat 212. To provide the first flow characteristic, the cage 214 is positioned relative to the valve seat 212 such that respective ones of the first openings 440 align with respective ones of the passageways 412 to define the openings 304 (e.g., the windows) through which fluid flow can pass between the inlet 206 and the outlet 208 of the fluid flow passageway 204. For example, the projections 434 of the valve seat 212 are positioned adjacent the passageways 412 of the cage 214. Thus, the openings 304 of the valve trim 200 are formed or defined by the passageways 412 and the first openings 440 of the valve seat 212. In this manner, the passageways 412 are not obstructed by (e.g., are clear or free of) the projections 434. In the first orientation 602, respective ones of the projections 434 of the valve seat 212 are in alignment with (e.g., nested within the offset profiles 502 of) respective ones of the walls 420 of the cage 214. Thus, the walls 420 block the second openings 442 to restrict or prevent fluid flow through the second openings 442. In this manner, the projections 434 do not affect (e.g., decrease) a fluid flow area of the passageways 412. In other words, the projections 434 of the valve seat 212 do not alter or affect a flow passageway (e.g., the openings 304) defined by a shape of a perimeter or cross-sectional area of the passageways 412.

Figure 7:
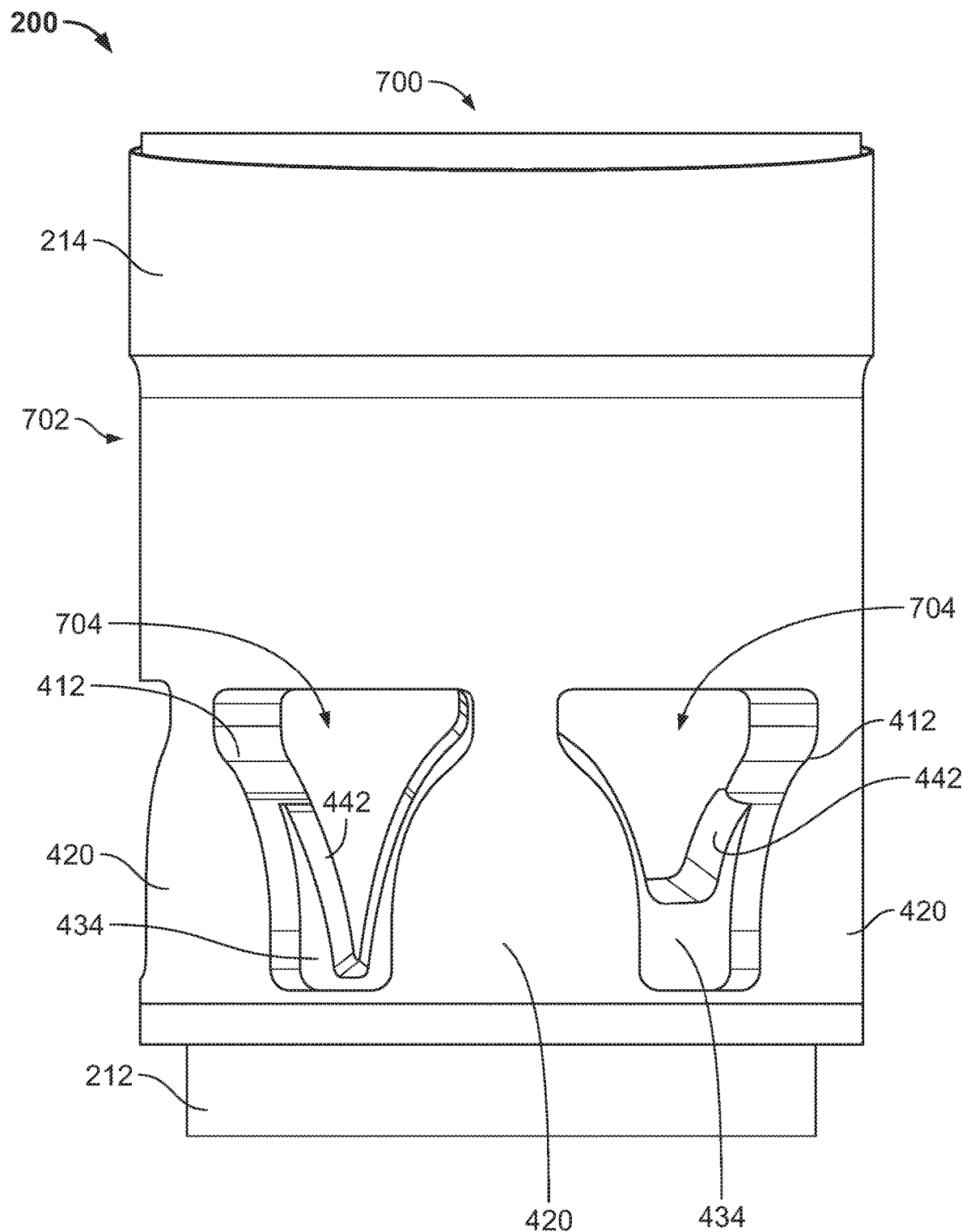
FIG. 7 is a front view of the valve trim of FIGS. 1-5 configured to provide a second flow characteristic.

FIG. 7 is a front view of the valve trim of FIGS. 1-5 configured to provide a second flow characteristic 700 different than the first flow characteristic 600 of FIG. 6. For example, the second flow characteristic 700 provides an equal-percentage flow characteristic for a given change in position of the flow control member 224 as the flow control member 224 moves from the closed position 228 (FIG. 2) toward the open position 300 (FIG. 3). The valve trim 200 provides the second flow characteristic 700 when the cage 214 is positioned in a second orientation 702 relative to the valve seat 212 (e.g., different than the first orientation 602 of FIG. 6). To provide the second flow characteristic 700, the cage 214 is positioned relative to the valve seat 212 such that respective ones of the second openings 442 align with respective ones of the passageways 412 of the cage 214 to define openings 704 (e.g., windows) of the valve trim 200 through which the fluid flow can pass between the inlet 206 and the outlet 208 of the fluid flow passageway 204. In the second orientation 702, respective ones of the first openings 440 of the valve seat 212 are in alignment with (e.g., blocked by) respective ones of the walls 420 of the cage 214. Thus, the walls 420 block the first openings 440 to restrict or prevent fluid flow through the first openings 440. In this manner, respective ones of the projections 434 obstruct (e.g., align with) respective ones of the passageways 412 to reduce a fluid flow passageway (e.g., a flow path of the opening 704) through which fluid can flow between the inlet 206 and the outlet 208. In other words, in the second orientation 702, the projections 434 of the valve seat 212 alter or affect a flow passageway (e.g., the openings 704) defined by a shape of a perimeter or cross-sectional area of the passageways 412. In the illustrated example, the projections 434 reduce or decrease a fluid flow area of the passageways 412 when the projections 434 align with the passageways 412. In the second orientation 702, the openings 704 enable a different volume (e.g., a lesser amount) of fluid flow therethrough compared to the openings 304 provided when the cage 214 is in the first orientation 602 relative to the valve seat 212. A profile or shape of the second openings 442, the projections 434 and/or the passageways 412 provide the second flow characteristic 700.

Thus, the valve trim 200 of the illustrated example provides the first flow characteristic 600 when the when the cage 214 is positioned in the first orientation 602 relative to the valve seat 212 and the second flow characteristic 700 when the cage 214 is positioned in a second orientation 702 relative to the valve seat 212 different than the first orientation 602. In some examples, the valve trim 200 can be configured to provide a third flow characteristic, a fourth flow characteristic, etc. For example, to provide a third flow characteristic, the cage 214 can be positioned in a third orientation relative to the valve seat 212 different than the first and second orientations. In the third orientation, at least a portion of a respective one of the second openings 442 (e.g., half of the projections 434) and at least a portion a respective one of the first openings 440 align with a respective one of the passageways 412 to provide the third flow characteristics. In other examples, a number or shape of the second openings 442 and/or the size and/or shape of the projections 434 can be configured to provide a third flow characteristic different than the first and second fluid flow characteristics. In some examples, a number and/or a profile of the projections 434, the first openings 440, the second openings 442 and/or the passageways 412 can be configured to provide any other type of flow characteristic(s).

Figure 8A:
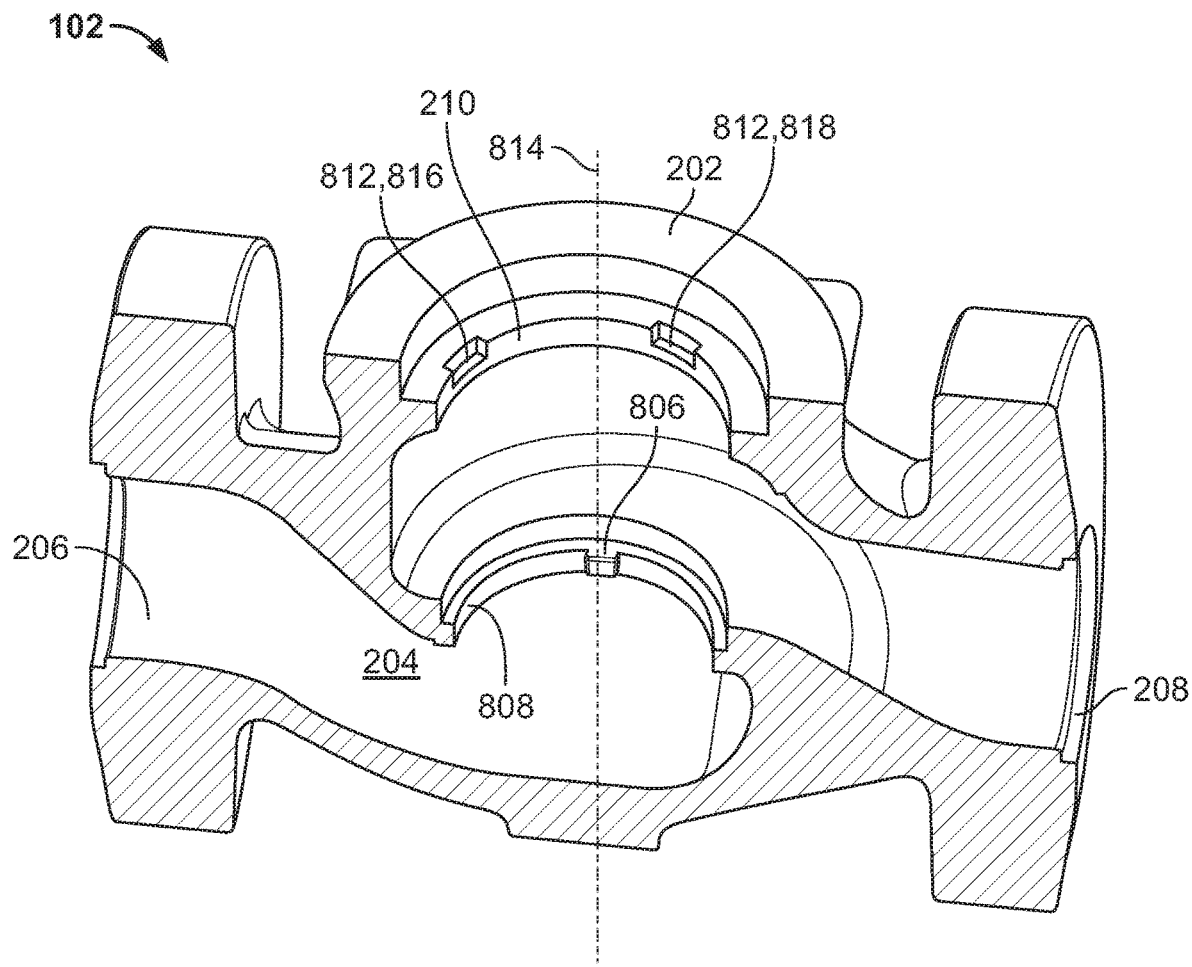
FIG. 8A is a cross-sectional, perspective view of an example valve body of FIGS. 1-3.
Figure 8B:
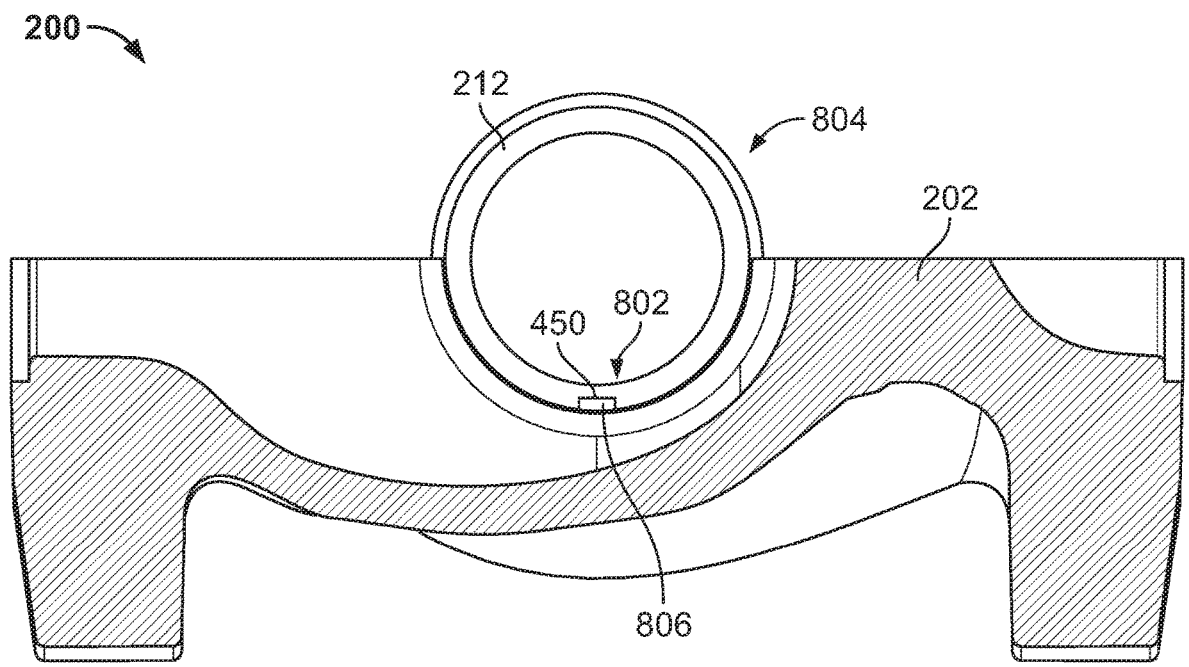
FIG. 8B is a bottom, cross-sectional view of the example valve body taken alone line 8B-8B of FIG. 3 and showing the example valve trim coupled to the example valve body.
Figure 8C:
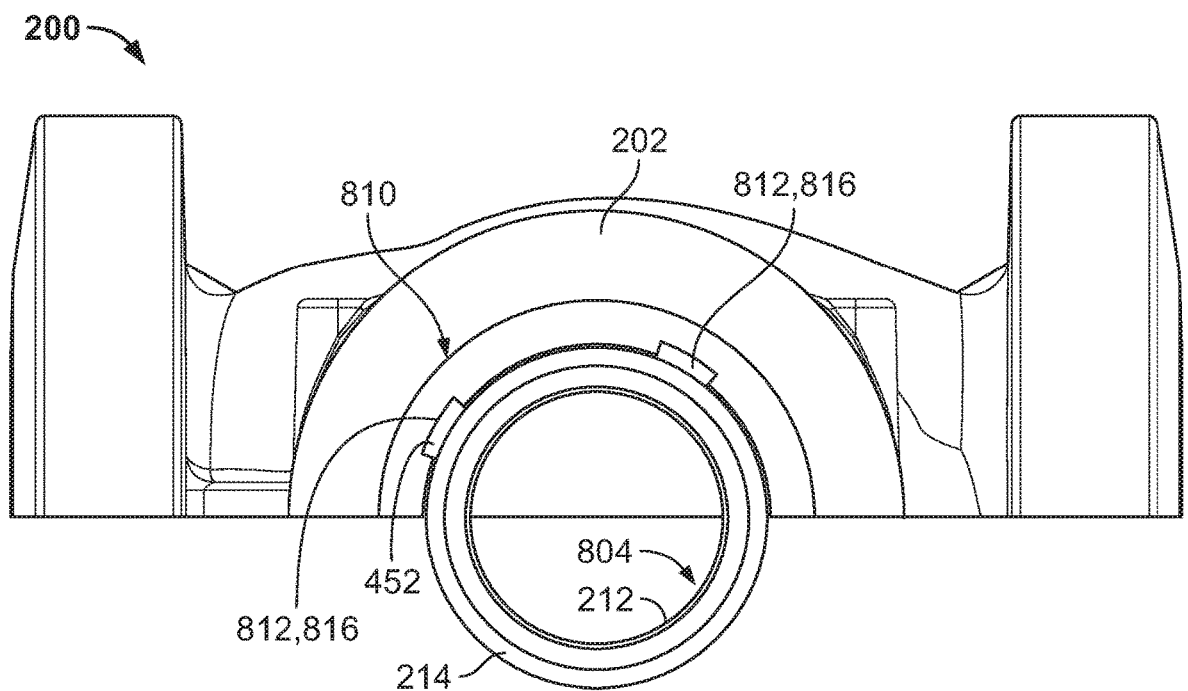
FIG. 8C is a top, cross-sectional view of the example valve body of FIGS. 1-3 showing the example valve trim coupled to the example valve body.

FIG. 8A is a cross-sectional, perspective view of the valve body 202 of FIGS. 1-3. FIG. 8B is a bottom, cross-sectional view of the valve body taken alone line 8B-8B of FIG. 3 with the valve trim 200 coupled to the valve body 202. FIG. 8C is a top, cross-sectional view of the valve body 202 of FIGS. 2 and 3 with the valve trim 200 coupled to the valve body 202.

Referring to FIGS. 8A-8C, to fix and/or orient a position (e.g., a predetermined position) of the valve seat 212 relative to the valve body 202, the valve seat 212 and the valve body 202 include a first key 802 (FIG. 8B). The first key 802 locates or positions the valve seat 212 relative to the valve body 202 in a predetermined orientation 804. The first key 802 includes a locating tab 806 and the locating slot 450 to receive the locating tab 806. In the illustrated example, the valve body 202 of the illustrated example includes the locating tab 806. The locating tab 806 protrudes from an inner wall or surface 808 of the valve body 202 defining the fluid flow passageway 204. The locating tab 806 engages (e.g., is received by) the locating slot 450 of the valve seat 212 to fix a position and/or an orientation of the valve seat 212 relative to the valve body 202 in the predetermined orientation 804. In some examples, the valve seat 212 includes the locating tab 806 and the valve body 202 includes the locating slot 450. In other words, either of the valve seat 212 or the valve body 202 includes the locating tab 806 and the other one of the valve seat 212 or the valve body 202 includes the locating slot 450.

To position the cage 214 in the first orientation 602 (FIG. 6) or the second orientation 702 (FIG. 7) relative to the valve seat 212, the cage 214 and the valve body 202 define a second key 810. The second key 810 includes the orientation tab 452 of the cage 214 and a plurality of orientation slots 812 formed in the valve body 202. The orientation slots 812 are radially spaced relative to a longitudinal axis 814 of the bore 210 (e.g., about a circumference of the bore 210) configured to receive the cage 214. A number of the orientation slots 812 corresponds to a number of possible flow characteristics of the valve trim 200. For example, a first orientation slot 816 formed on the valve body 202 corresponds to the first flow characteristic 600 and a second orientation slot 818 formed on the valve body 202 corresponds to the second flow characteristic 700. Thus, the orientation tab 452 is positioned in engagement or is received by the first orientation slot 816 form to position the cage 214 in the first orientation 602 relative to the valve seat 212 and the orientation tab 452 is positioned in engagement with or is received by the second orientation slot 818 to position the cage 214 in the second orientation 702 relative to the valve seat 212. In some examples, the valve body 202 includes a third orientation slot to position the cage 214 in a third orientation relative to the valve seat 212 that is different than the first orientation 602 and the second orientation 702.

Figure 9:
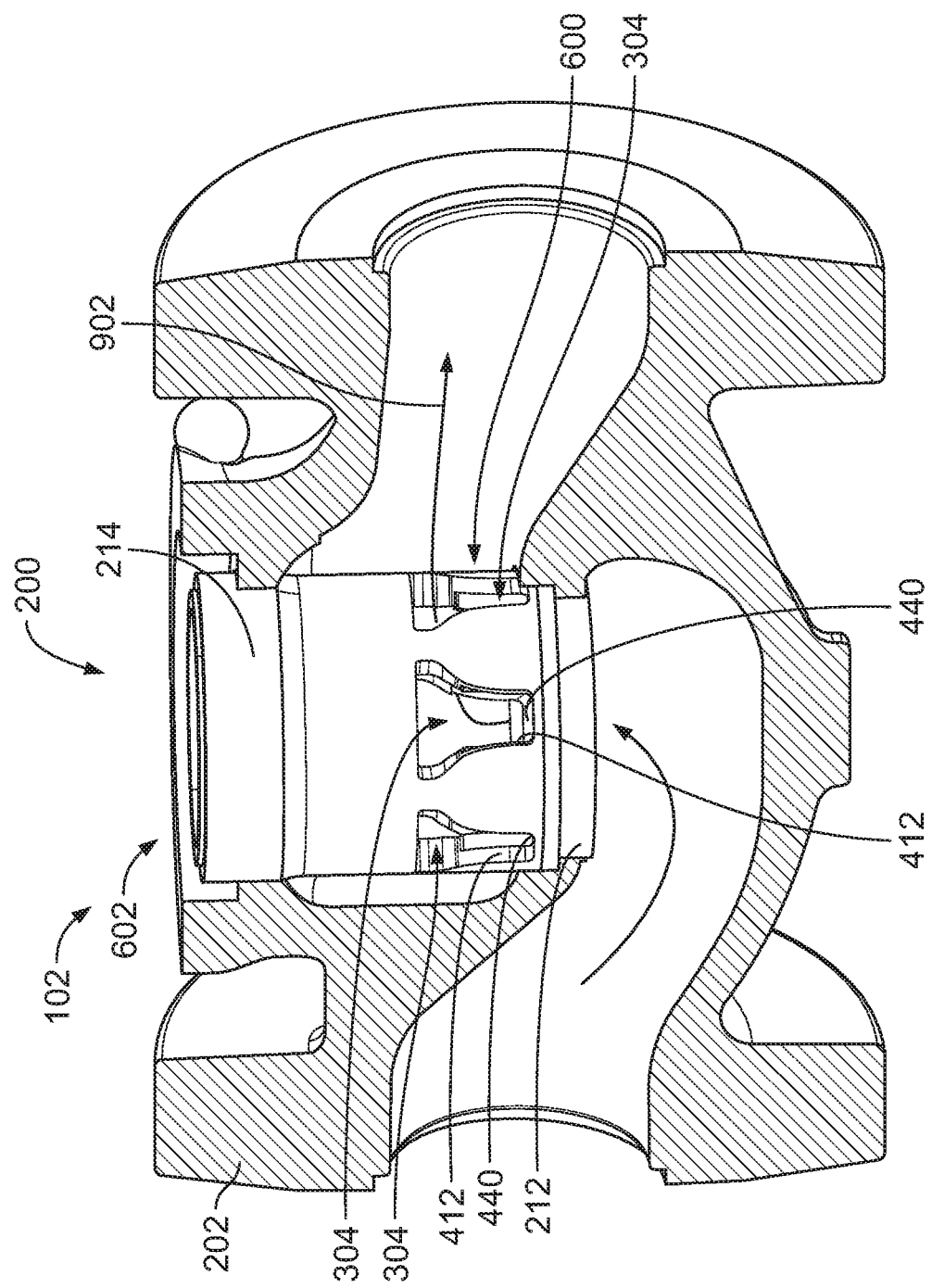
FIG. 9 is a partial cross-sectional, perspective view of the example valve body and the example valve trim when the example valve trim is in the example first orientation.

FIG. 9 is a partial cross-sectional, perspective view of the valve body 202 and the valve trim 200 when the valve trim 200 is in the first orientation 602 configured to provide the first flow characteristic 600. In the first orientation 602, respective ones of the first openings 440 of the valve seat 212 align with the respective ones of the passageways 412 of the cage 214 such that the openings 304 provide a fluid flow path 902 providing a linear flow characteristic as the flow control member 224 moves between the closed position 228 and the open position 300.

Figure 10:
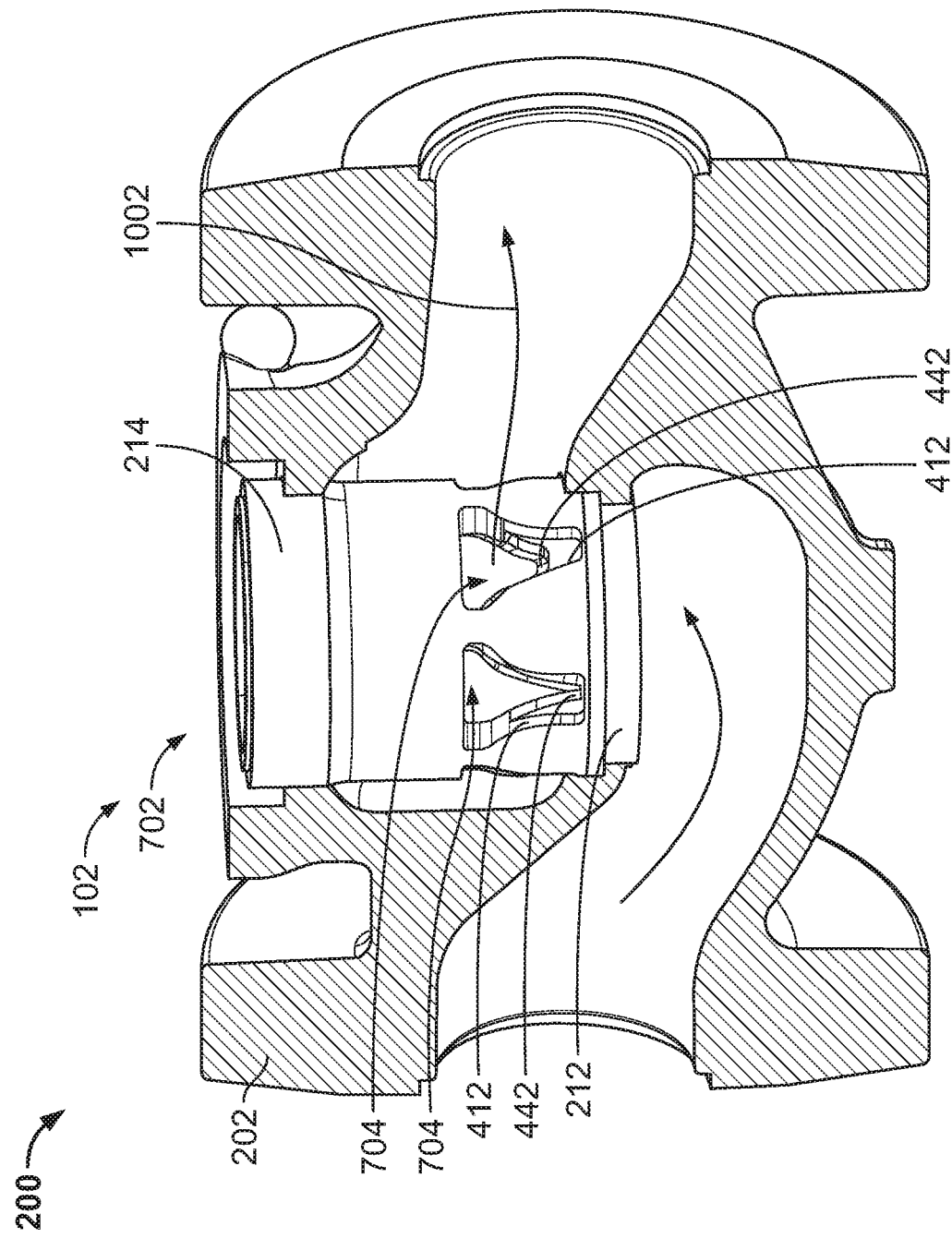
FIG. 10 is a partial cross-sectional, perspective view of the example valve body and the example valve trim when the example valve trim is in the example second orientation.

FIG. 10 is a partial cross-sectional, perspective view of the valve body 202 and the valve trim 200 when the valve trim 200 is in the second orientation 702 configured to provide the second flow characteristic 700. In the second orientation 702, respective ones of the second openings 442 of the valve seat 212 align with the respective ones of the passageways 412 of the cage 214 such that the openings 704 provide a fluid flow path 1002 providing an equal-percentage as the flow control member 224 moves between the closed position 228 and the open position 300.

Figure 11A:
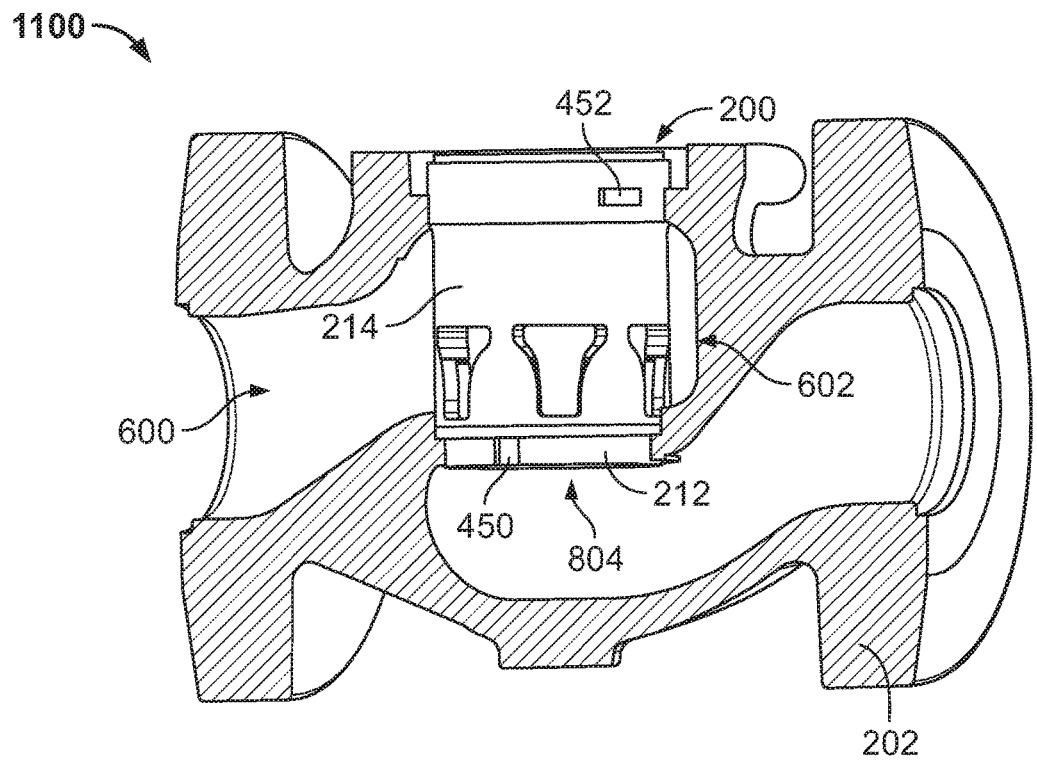
FIGS. 11A-11D are schematic illustration representative of an example method 1100 to configure the example valve trim between the example first flow characteristic and the second flow characteristic 700.

FIGS. 11A-11D are schematic illustrations representative of an example method 1100 to configure the valve trim 200 between the first flow characteristic 600 and the second flow characteristic 700. Referring to FIG. 11A, the valve trim 200 is positioned to provide the first flow characteristic 600. Specifically, the cage 214 is in the first orientation 602 relative to the valve seat 212, and the valve seat 212 is fixed to the valve body 202 in the predetermined orientation 804 (e.g., via the first key 802 of FIG. 8B). For example, the locating tab 806 (FIG. 8A) of the valve body 202 is positioned in the locating slot 450 of the valve seat 212 to fix a position of the valve seat 212 relative to the valve body 202. Additionally, the orientation tab 452 of the cage 214 is positioned in the first orientation slot 816 (FIG. 8A) of the valve body 202 to position the cage 214 in the first orientation 602.

Figure 11B:
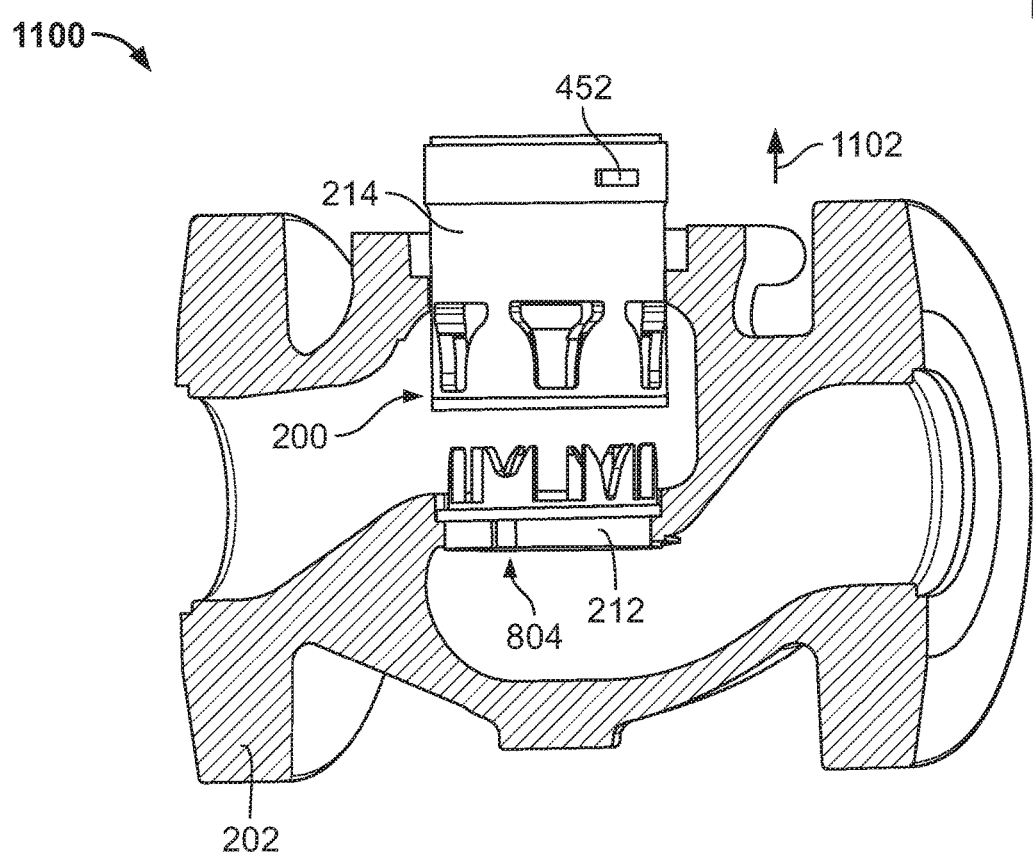
Figure 11C:
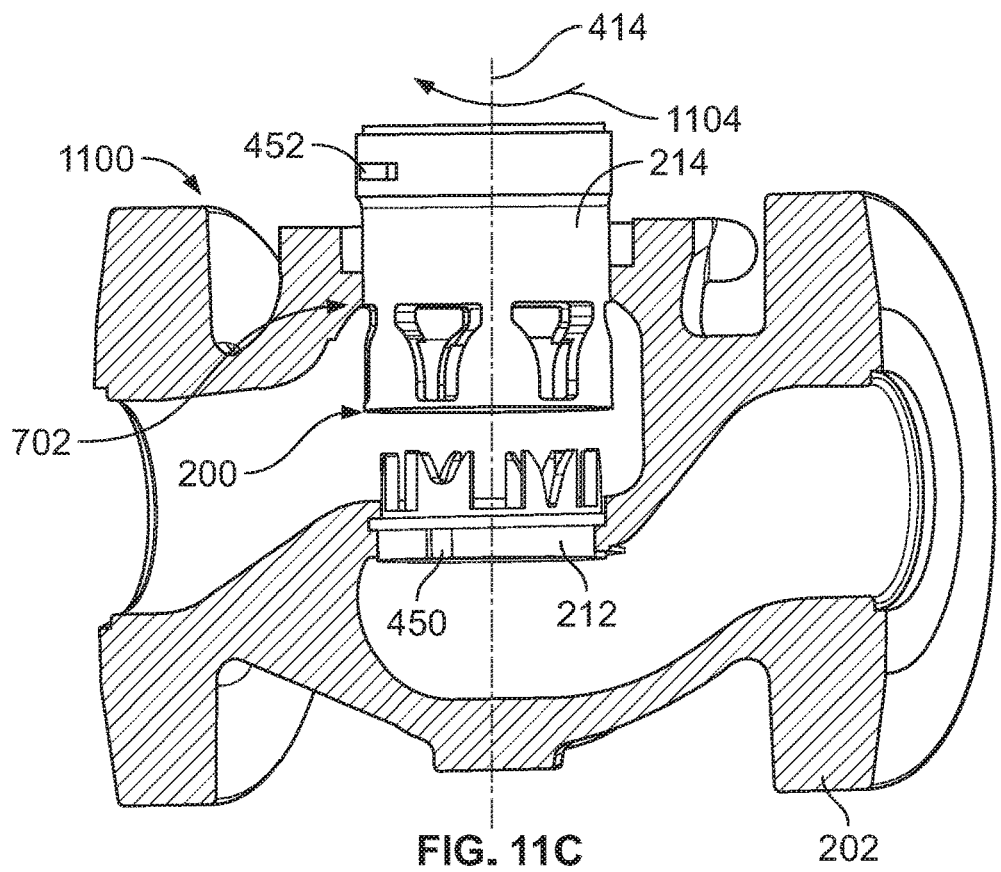

Referring to FIG. 11B, to change or convert the valve trim 200 to provide the second flow characteristic 700, a user removes the actuator 104 (FIG. 1) and the bonnet 106 (FIG. 1) from the valve body 202. In some examples, the valve stem 226 and the flow control member 224 are removed. The cage 214 is then moved in a direction 1102 (e.g., an upward direction in the orientation of FIG. 11B) away from the valve seat 212 to remove or disengage the orientation tab 452 of the cage 214 from the first orientation slot 816 of the valve body 202. The valve seat 212 is maintained in the predetermined orientation 804 via the first key 802. In other words, the valve seat 212 is not removed from the valve body 202.

Referring to FIG. 1 the cage 214 is rotated about the longitudinal axis 414 of the cage 214 in a rotational direction 1104 (e.g., a clockwise direction in the orientation of FIG. 11C) to move the orientation tab 452 toward the second orientation slot 818 of the valve body 202. For example, the cage 214 is clocked between 30 degrees and 60 degrees (e.g., 45 degrees) to change the orientation of the cage 214 relative to the valve seat 212 between the first orientation 602 and the second orientation 702.

Figure 11D:
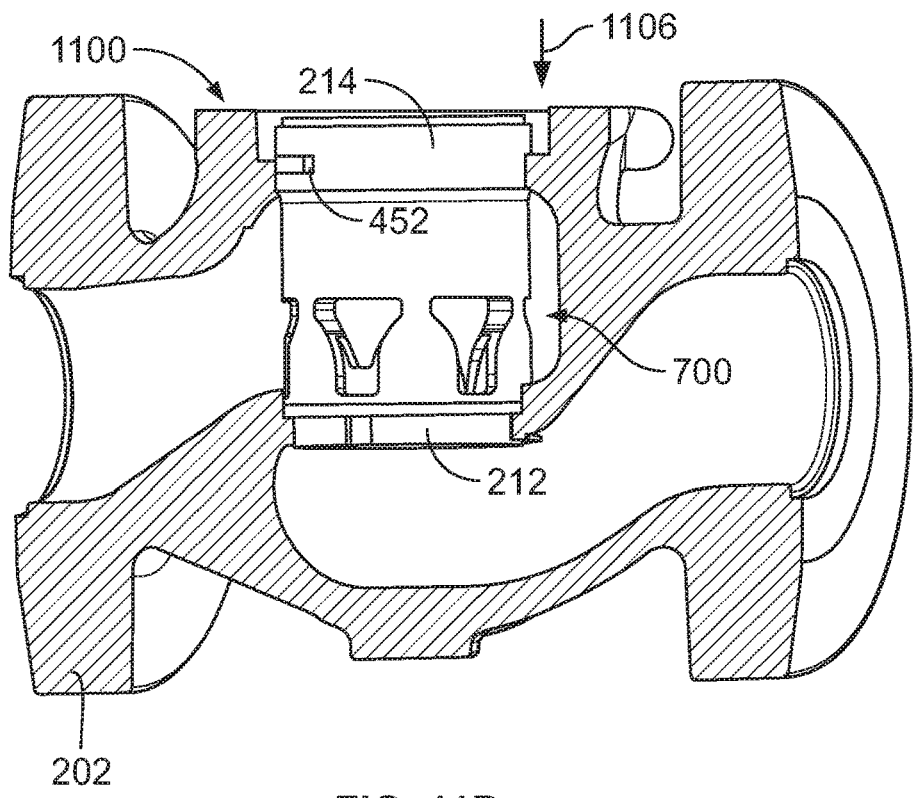
Figure 12A:
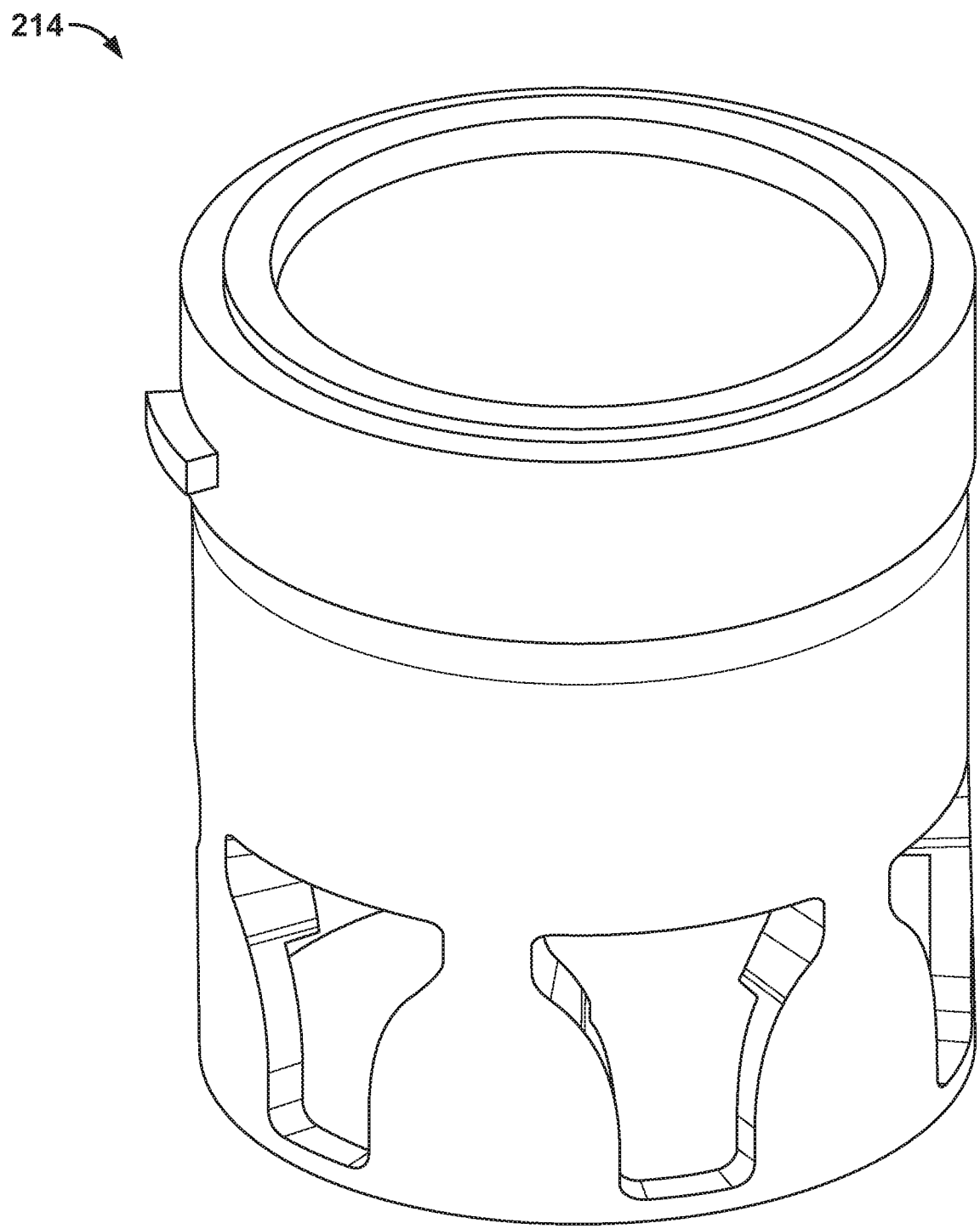
FIGS. 12A-12G are various views of an example cage of the example valve trim of FIGS. 1-7, 8A-8C, 9, 10, and 11A-11D.
Figure 12B:
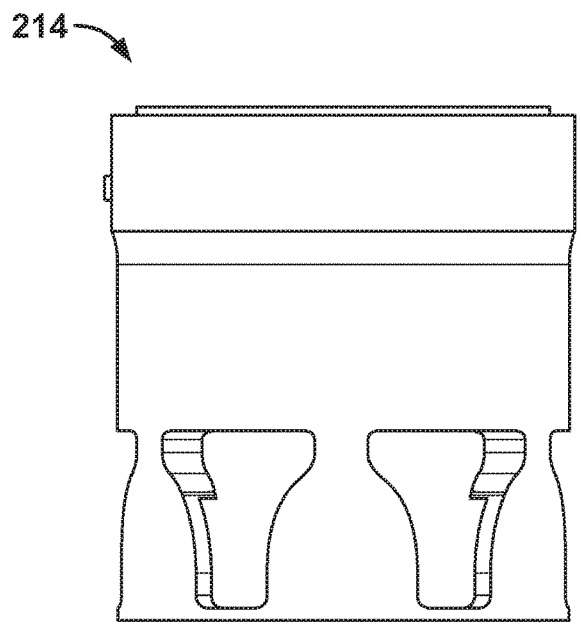
Figure 12C:
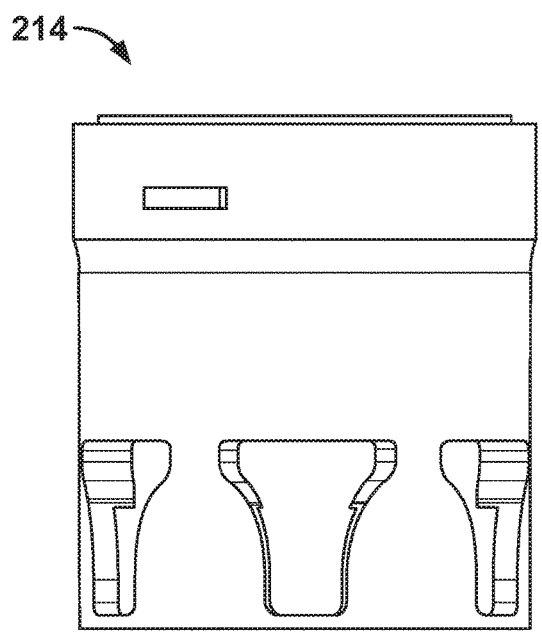
Figure 12D:
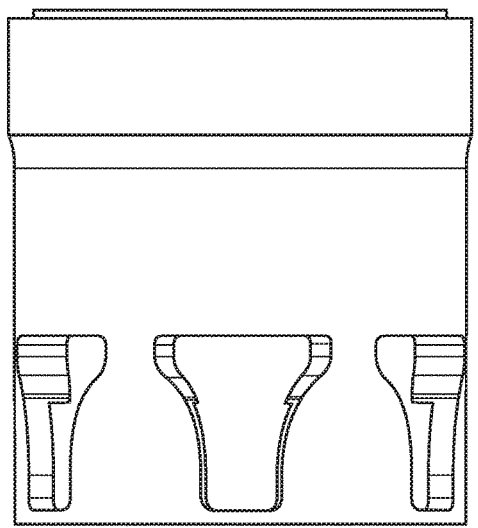
Figure 12E:
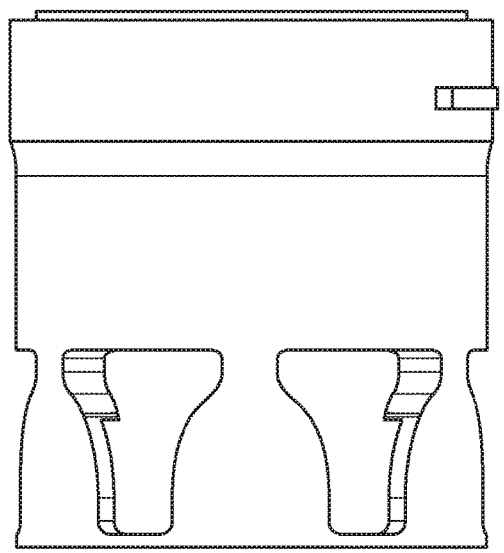
Figure 12F:
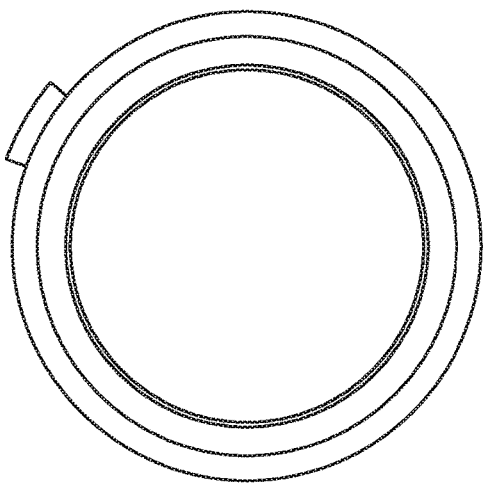
Figure 12G:
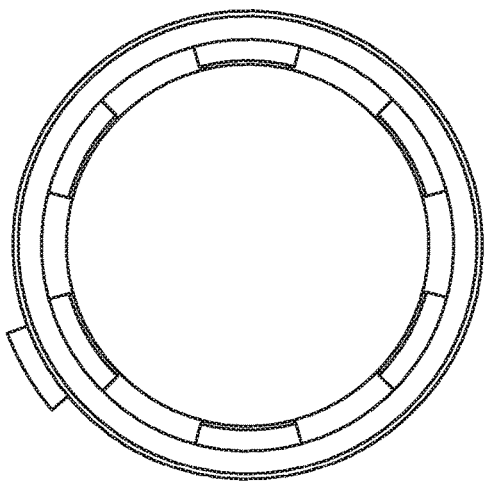
Figure 13A:
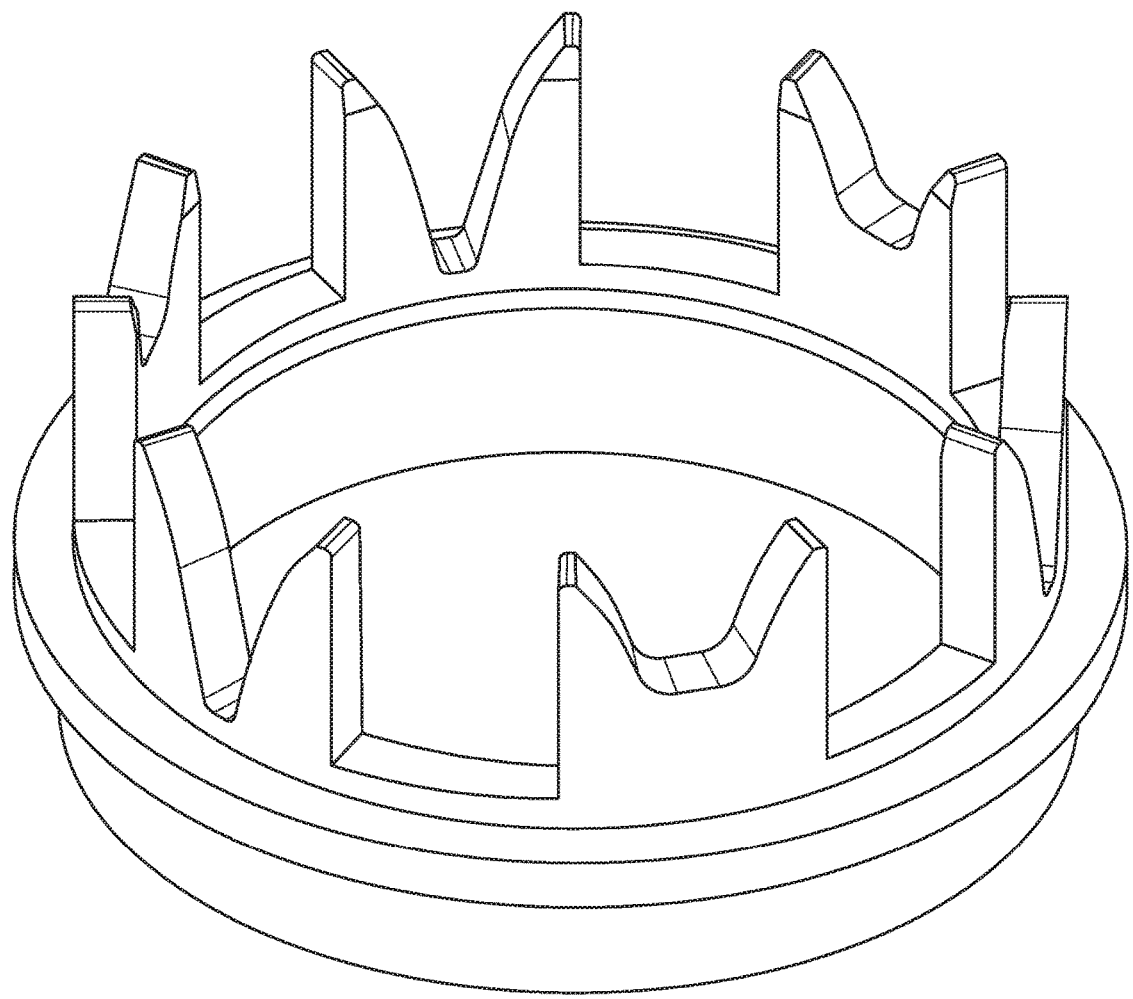
FIGS. 13A-13G are various views of an example valve seat of the example valve trim of FIGS. 1-7, 8A-8C, 9, 10, and 11A-11D.
Figure 13B:
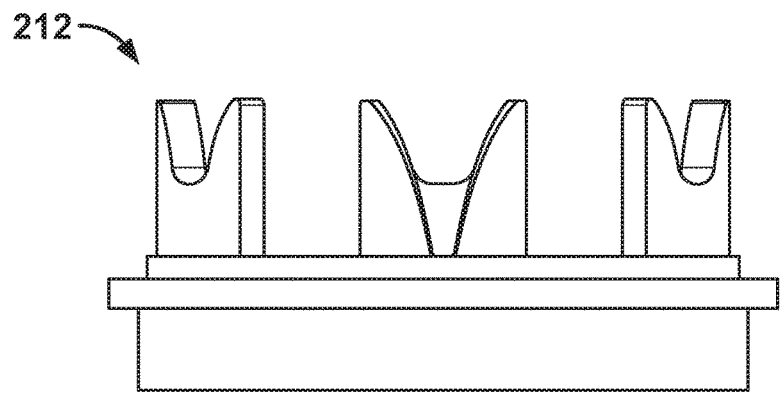
Figure 13C:
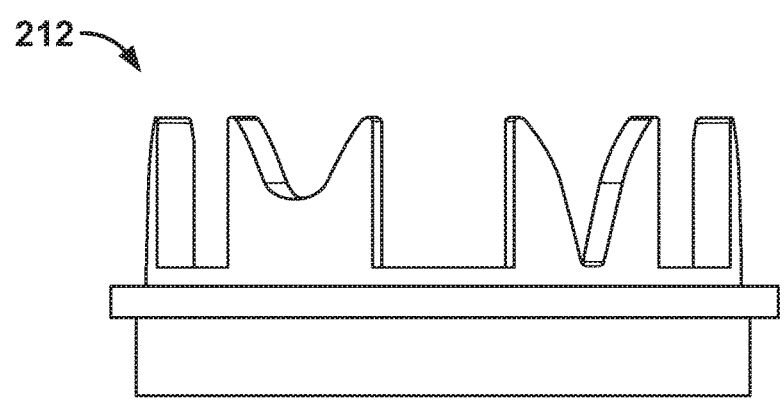
Figure 13D:
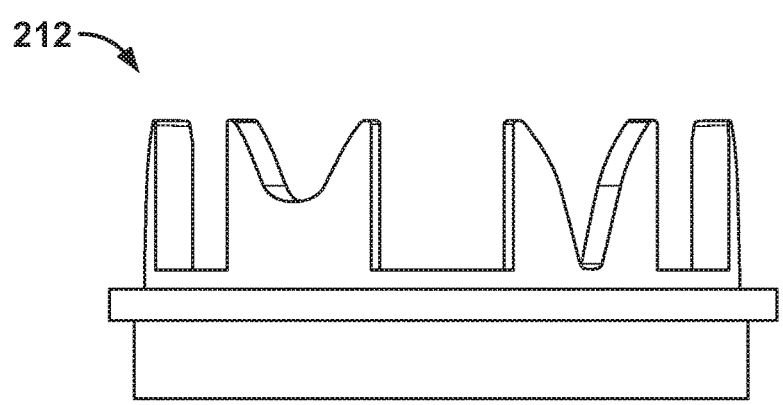
Figure 13E:
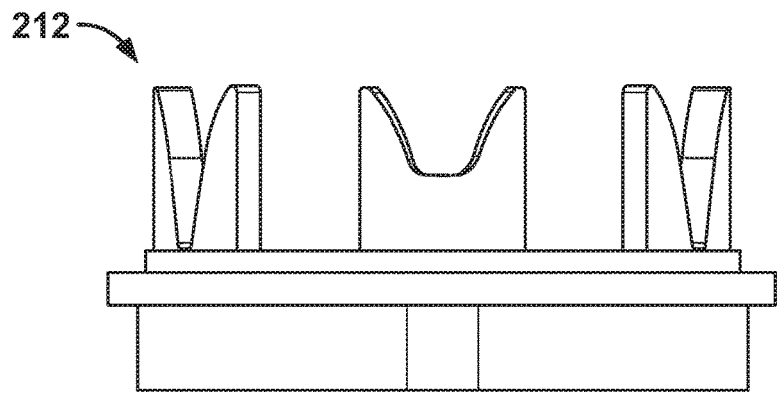
Figure 13F:
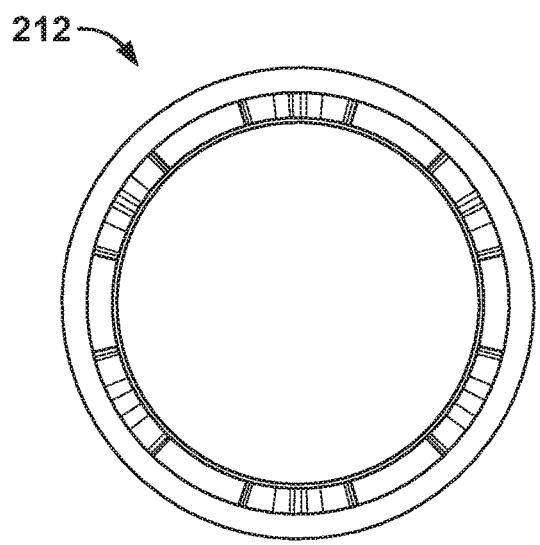
Figure 13G:
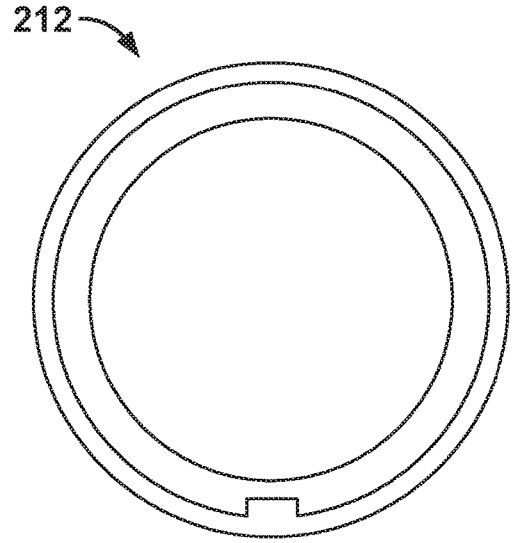

Referring to FIG. 11D, when the orientation tab 452 is aligned with the second orientation slot 818, the cage 214 is moved in a direction 1106 (e.g., a downward direction in the orientation of FIG. 11D) toward the valve seat 212 to position the orientation tab 452 within or into engagement with the second orientation slot 818 (FIG. 8A) of the valve body 202. The bonnet 106 and the actuator 104 are attached to the valve body 202. In some examples, the valve stem 226 and the flow control member 224 are positioned in the central bore 406 of the cage 214 prior to attaching the bonnet 106 and the actuator 104 to the valve body 202. Thus, the valve seat 212 does not need to be removed from the valve body 202 to change the valve trim 200 between the first flow characteristic 600 and the second flow characteristic 700.

FIGS. 12A-12G are various views of the cage 214 of FIGS. 1-7, 8A-8C, 9, 10 and 11A-11D. FIGS. 13A-13G are various views of the valve seat 212 of FIGS. 1-7, 8A-8C, 9, 10 and 11A-11D.

From the foregoing, the valve trim 200 disclosed herein can be configured to provide two or more flow characteristics with the same set of trim parts (e.g., the cage 214 and the valve seat 212), thereby reducing manufacturing costs. For example, the valve trim 200 provides different flow characteristic configurations based on an alignment of the passageways 412 of the cage 214 and openings (e.g., the first and second openings 440, 442) provided by the valve seat 212. For example, the valve trim 200 provides the first flow characteristic 600 when the passageways 412 align with first openings 440 of the valve seat 212 and provides the second flow characteristic 700 when the passageways 412 of the cage 214 align with the second openings 442. In some such examples, the cage 214 may be positioned relative to the valve seat 212 in a third orientation (e.g., corresponding to a third orientation slot of the valve body 202) to provide a third flow characteristic different than the first and second flow characteristics. For example, in the third orientation, a first portion (e.g. a first half) of one of the passageways 412 of the cage 214 aligns with a portion (e.g., a half) of one of the first openings 440 and a second portion (e.g., a second half) of the one of the passageways 412 aligns with a portion (e.g., a half) of one of the second openings 442. In this manner, respective ones of the passageways 412 of the cage 214 align with respective portions (e.g., half portions) of respective ones of the first and second openings 440, 442.

In some examples, an example valve seat disclosed herein can include a set of third prongs projecting from the valve seat to provide third openings that have a profile or shape that are different than profiles and shapes of the first and second openings. In some such examples, the cage 214 can be positioned relative to the valve seat in a third orientation different than the first and second orientations. In the third orientation, the passageways 412 of the cage 214 align with the third openings provided by the set of third prongs of the valve seat to provide a third flow characteristic different than the first and second flow characteristics.

In some examples, an example valve trim disclosed herein can be configured to provide a plurality of different flow characteristics. For example, a valve seat disclosed herein can employ a plurality of different prongs or projections to define a respective plurality of different openings. A passageway of the cage can align with a first opening of the valve seat to provide a first flow characteristic, a passageway of the cage can align with a second opening of the valve seat to provide a second flow characteristic different than the first flow characteristic, a passageway of the cage can align with a third opening of the valve seat to provide a third flow characteristic different than the first and second fluid flow characteristics, a passageway of the cage can align with a fourth opening of the valve seat to provide a fourth flow characteristic different than the first, second and third fluid flow characteristics, etc.

In some examples, the passageways of the cage can include a first set of passageways having a first shape or profile and a second set of passageways having a second shape or profile different than the first set of passageways. In some such examples, the first set of passageways align with a first set of openings provided by the valve seat to provide a first flow characteristic, the second set of passageways of the cage align with a second set of openings of the valve seat to provide a second flow characteristic different than the first flow characteristic, the third set of passageways of the cage align with a third set of openings of the valve seat to provide a third flow characteristic different than the first and second flow characteristics, etc. In some examples, a valve seat can be configured with passageways (e.g., the passageways 412) and a cage can be configured with one or more prongs (e.g., the projections 434) to define first openings (e.g., the first openings 440) and second openings (e.g., the second openings 442).

In some examples, a cage and a valve seat can include a plurality of holes or apertures (e.g., pin holes) that can overlap or align to define a plurality of windows or openings (e.g., the openings 304, 704) that provide different flow characteristics. In some such examples, the holes of the cage can be configured to align with the holes of the valve seat in various configures to provide different flow characteristics. For example, the cage can be oriented relative to the holes of the valve seat such that the holes of the cage remain fully open to provide a first flow characteristic, the cage can be oriented relative to the holes of the valve seat such that the holes of the cage are partially open (e.g., 75% open) to provide a second flow characteristic, the cage can be oriented relative to the holes of the valve seat such that the holes of the cage are partially blocked (e.g., 75% blocked) to provide a third flow characteristic, etc.

In some examples, the fluid valve 102 and/or the valve body 202 provides means for defining a fluid flow passageway. In some examples, the valve seat 212, the sealing surface 230 and/or the flow control member 224 provide a means for sealing. In some examples, the cage 214 provides means for guiding that is positionable relative to the valve seat (e.g., a means for sealing) between at least one of a first orientation or a second orientation different from the first orientation. In some examples, the first key 802 provides first means for fixing the valve seat 212 relative to the valve body 202 in a predetermined orientation. In some examples, the second key 810 provides a second means for fixing the cage 214 relative to the valve seat 212 or the valve body 202 in the first orientation or the second orientation. In some examples, the openings 304 and/or 704 provide means for characterizing fluid flow characteristic. In some examples, the projections 434 provide means for obstructing fluid flow across at least a portion of the passageways 412. In some examples, the passageways 412 and the first openings 440 provide means for defining a first flow characteristic and the passageways 412 and the second openings 442 provide means for defining a second flow characteristic. In some examples, the passageways 412 provide means for characterizing fluid flow and the projections 434 provide means for obstructing the means for characterizing fluid flow.

Although certain apparatus, methods and articles of manufacture have been described herein, the scope of coverage of this patent is not limited thereto. To the contrary, this patent covers all apparatus, methods and articles of manufacture fairly falling within the scope of the appended claims either literally or under the doctrine of equivalents.

What is claimed is:

1. A valve trim comprising:
   a cage defining a body having a bore to receive a valve plug, the cage including passageways through a side surface of the body that are radially spaced relative to a longitudinal axis of the bore; and
   a valve seat to receive the cage, the valve seat having projection defining first openings and second openings, ones of the first openings to align with respective ones of the passageways to provide a first flow characteristic when the cage is positioned in a first orientation relative to the valve seat, and ones of the second openings to align with respective ones of the passageways of the cage to provide a second flow characteristic different than the first flow characteristic when the cage is positioned in a second orientation relative to the valve seat different than the first orientation.

2. The valve trim as defined in claim 1, wherein at least one of the passageways of the cage is unobstructed by the projections when the cage is in the first orientation relative to the valve seat to provide the first flow characteristic.

3. The valve trim as defined in claim 1, wherein at least one of the passageways of the cage is obstructed by at least one of the projections when the cage is in the second orientation relative to the valve seat to provide the second flow characteristic.

4. The valve trim as defined in claim 1, wherein the first flow characteristic is a linear flow characteristic and the second flow characteristic is an equal-percentage flow characteristic.

5. The valve trim as defined in claim 1, wherein the cage includes an orientation tab to engage at least one of a first slot of a valve body to orient the cage in the first orientation or a second slot of the valve body to orient the cage in the second orientation different than the first orientation.

6. The valve trim as defined in claim 1, wherein the valve seat includes a locating slot to receive a locating tab of a valve body to fix an orientation of the valve seat relative to the valve body when the valve seat is positioned in the valve body.

7. The valve trim as defined in claim 1, wherein the first openings are formed between the projections and the second openings are formed by the projections.

8. The valve trim as defined in claim 1, wherein the second openings include a first set of second openings each having a first shape and a second set of second openings each having a second shape different than the first shape.

9. A valve comprising:
a valve body defining a fluid flow passageway between an inlet and an outlet;
a valve seat positioned in the valve body to define an orifice of the fluid flow passageway, the valve seat defining projections; and
a cage positioned in the fluid flow passageway, the cage defining a bore and passageways formed through a side surface of the cage, the cage to slidably receive a valve plug at a first end of the bore and to at least partially receive a portion of the projections of the valve seat at a second end of the bore opposite the first end, the cage is positionable relative to the valve seat in different orientations to provide different fluid flow characteristics.

10. The valve as defined in claim 9, wherein each of the different orientations is to provide a respective one of the different fluid flow characteristics.

11. The valve as defined in claim 9, wherein at least one of the projections has a longitudinal length capable of extending across at least a portion of at least one of the passageways.

12. The valve as defined in claim 9, wherein the valve seat and the valve body include a first key to fix a position of the valve seat relative to the valve body.

13. The valve as defined in claim 12, wherein the first key includes a locating tab and a locating slot to receive the locating tab, one of the valve seat or the valve body includes the locating tab and the other one of the valve seat or the valve body includes the locating slot.

14. The valve as defined in claim 12, wherein the cage and the valve body define a second key to position the cage in at least one of a first orientation relative to the valve seat or a second orientation relative to the valve seat that is different than the first orientation.

15. The valve as defined in claim 14, wherein the second key includes an orientation tab protruding from the side surface of the cage and orientation slots formed in the valve body, the orientation slots being radially spaced relative to a longitudinal axis of a bore defined by the valve body that is configured to receive the cage.

16. The valve as defined in claim 15, wherein the orientation tab is to engage a first one of the orientation slots to position the cage in a first orientation relative to the valve seat.

17. The valve as defined in claim 16, wherein the orientation tab is to engage a second one of the orientation slots to position the cage in a second orientation relative to the valve seat.

18. A valve trim comprising:
means for sealing including means for obstructing fluid flow; and
means for guiding a valve plug, the means for guiding including means for characterizing fluid flow, the means for guiding being positionable relative to the means for sealing between at least one of a first orientation or a second orientation different from the first orientation, the means for obstructing fluid flow being positioned adjacent the means for characterizing fluid flow when the means for guiding is in the first orientation, and the means for obstructing fluid flow to align with the means for characterizing fluid flow when the means for guiding is in the second orientation.

19. The valve trim as defined in claim 18, wherein the means for obstructing fluid flow does not obstruct the means for characterizing fluid flow when the means for guiding is in the first orientation, and the means for obstructing fluid flow extends across at least a portion of the means for characterizing fluid flow when the means for guiding is in the second orientation.

20. The valve trim as defined in claim 18, further including means for defining a fluid flow passageway between an inlet and an outlet, the means for defining the fluid flow passageway configured to receive the means for sealing and the means for guiding the valve plug, wherein the means for guiding and the means for defining the fluid flow passageway includes a first means for fixing the means for guiding in the first orientation or the second orientation, and the means for sealing and the means for defining the fluid flow passageway includes a second means for fixing the means for sealing relative to the means for defining the fluid flow passageway in a third orientation.

* * * * *